(12) United States Patent
Acreman et al.

(10) Patent No.: US 11,698,550 B2
(45) Date of Patent: Jul. 11, 2023

(54) COMPOSITE LENS SYSTEM WITH CHANGEABLE FOCAL LENGTH

(71) Applicant: SHARP KABUSHIKI KAISHA, Sakai (JP)

(72) Inventors: Andrew Acreman, Oxford (GB); Nathan James Smith, Oxford (GB); David James Montgomery, Bampton (GB)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/329,774

(22) Filed: May 25, 2021

(65) Prior Publication Data
US 2022/0382100 A1 Dec. 1, 2022

(51) Int. Cl.
*G02F 1/1335* (2006.01)
*G02F 1/13363* (2006.01)

(52) U.S. Cl.
CPC .. *G02F 1/133526* (2013.01); *G02F 1/133541* (2021.01); *G02F 1/133638* (2021.01)

(58) Field of Classification Search
CPC ......... G02F 1/133526; G02F 1/133638; G02F 1/133541; G02F 1/294; G02F 2203/22; G02B 3/0087; G02B 27/286; G02B 27/30; G02B 27/0172
See application file for complete search history.

(56) References Cited

U.S. PATENT DOCUMENTS

| 10,451,885 | B2 | 10/2019 | Lu et al. |
| 2018/0031947 | A1 | 2/2018 | Shibuya et al. |
| 2022/0197043 | A1* | 6/2022 | Jang .......................... G02B 5/32 |

FOREIGN PATENT DOCUMENTS

| EP | 3017337 B1 | 12/2019 |
| GB | 2488979 A | 9/2012 |

* cited by examiner

*Primary Examiner* — Angela K Davison
(74) *Attorney, Agent, or Firm* — ScienBiziP, P.C.

(57) ABSTRACT

A composite lens system may include one or more first optical elements configured to provide a first focal length selected from a first continuous range of focal lengths, as well as one or more second optical elements configured to provide a discrete focal length selected from a plurality of discrete focal lengths. The one or more first optical elements and the one or more second optical elements may be configured in series such that the composite lens system provides an output focal length based on a combination of the selected first focal length and the selected discrete focal length.

22 Claims, 23 Drawing Sheets

COMPOSITE LENS SYSTEM WITH CHANGEABLE FOCAL LENGTH

FIELD

The present disclosure generally relates to a lens system and in particular relates to a composite lens system with a focal length that is changeable or tunable in discrete, continuous, and/or near-continuous increments.

BACKGROUND

Many optical components have been developed that provide corresponding optical functions of interest for various optical systems. While many of these components were created decades ago, a more recently developed optical component is a Pancharatnam-Berry phase (PB-phase) lens, which is a diffractive type of lens having a focal length that is dependent on the nature of the circularly polarized light being provided as input (specifically, the rotational sense or "handedness" of the input circular polarization). For example, in a simple PB-phase lens, a first circular polarization (e.g., a left-handed circular polarization) may be focused to a length F, while the opposite-handed circular polarization (e.g., a right-handed circular polarization) may be focused to a distance −F. In both cases, in response to input light of a particular polarization state or sense, the PB-phase lens provides circularly polarized output light with the opposite polarization sense.

PB-phase lenses may be made from any birefringent material, but are commonly made from liquid crystalline materials, such as a polymerizable liquid crystal (LC) material (e.g., reactive mesogens (RMs)). If the PB-phase lens is fashioned from a conventional liquid crystal material, the lens can be "switched" by application of an electric field, changing the focal length from +F or −F to 0 and switching the sense of the output circular polarization state (e.g., to match the input circular polarization state). Such a lens may be referred to as a Pancharatnam-Berry phase switch window (PB-phase SW). If the birefringent material is solid (e.g., not an LC material), the resulting lens is non-switchable in nature and may be referred to as Pancharatnam-Berry phase lens film (PB-phase lens film).

Further, due to the relationship between input polarization states and focal length, as described above, a PB-phase lens may be combined with a half-wave plate (HWP) LC-based component to create a system with a switchable focal length of 2F. More specifically, a static HWP (e.g., an HWP retardation film) may convert circularly polarized light of one sense or "handedness" to circularly polarized light of the opposite sense (e.g., convert right-handed circularly polarized to left-handed circularly polarized light, and vice-versa). An LC-based HWP provides the additional advantage of disabling this functionality, thus allowing the light to pass through the HWP substantially unchanged. Conventionally, the PB-phase lens in such a system is a solid birefringent film, such as an RM-type liquid crystal, as described above. Consequently, the combination of an LC-based HWP followed by a PB-phase lens film may apply a focal length of +F or −F to circularly polarized light of either rotational sense. Such a combination is referred to as a passive drive PB-phase lens.

Another useful optical component is a gradient-index (GRIN) lens, which provides a non-constant refractive index that spatially varies in a manner that provides an equivalent phase profile to that of a geometric lens. More specifically, the GRIN lens may be arranged according to a gradient along at least one dimension orthogonal to an optical axis of the lens. For example, the refractive index of a GRIN lens may vary (e.g., parabolically) according to a radial distance from the optical axis of the lens, thus allowing a GRIN lens with opposing planar surfaces to perform as a standard spherical or cylindrical lens (e.g., a planoconvex lens, a biconvex lens, a planoconcave lens, a biconcave lens, and so on), thus allowing a GRIN lens to be thinner and lighter compared to a standard lens.

Additionally, a GRIN lens may be created from an LC material to enable the focal length or power of the GRIN lens to be electrically tuned by the application of one or voltages. The focal range of such lenses, however, is typically limited, as producing a high-quality LC GRIN lens with a widely tunable optical power (e.g., 10 diopters, or 10D) may be difficult to produce. As such, a GRIN lens of significant focal range created from LC material is likely to provide poor image quality caused by diffraction and scattering effects.

SUMMARY

The present disclosure is directed to a composite lens system with a changeable or tunable focal length.

In accordance with one aspect of the present disclosure, a composite lens system may include one or more first optical elements configured to provide a first focal length selected from a first continuous range of focal lengths, and one or more second optical elements configured to provide a discrete focal length selected from a plurality of discrete focal lengths. The one or more first optical elements and the one or more second optical elements may be configured in series such that the composite lens system provides an output focal length based on a combination of the selected first focal length and the selected discrete focal length.

In an implementation of the first aspect, the one or more first optical elements may include at least a liquid crystal (LC) graduated index (GRIN) lens. Also, the one or more first optical elements may further include a quarter-wave plate (QWP) element that converts circularly polarized light received at the QWP element to linearly polarized light for the LC GRIN lens.

In another implementation of the first aspect, the one or more second optical elements may include at least a first Pancharatnam-Berry (PB) phase lens element. The PB phase lens element may provide a first negative discrete focal length in response to receiving circularly polarized light having a first rotational sense, and a first positive discrete focal length in response to receiving circularly polarized light having a second rotational sense opposite the first rotational sense. Also, the first PB phase lens may also provide the first negative discrete focal length and the first positive discrete focal length in response to a first control signal, and no focal length in response to a second control signal.

In another implementation of the first aspect, the one or more second optical elements may further include a half-wave plate (HWP) switch window. The HWP switch window may selectively convert circularly polarized light having the first rotational sense to circularly polarized light having the second rotational sense, and selectively convert circularly polarized light having the second rotational sense to circularly polarized light having the first rotational sense.

In another implementation of the first aspect, the one or more second optical elements may further include a second PB phase lens element. The second PB phase lens element may provide a second negative discrete focal length different from the first negative discrete focal length in response to receiving circularly polarized light having the first rotational sense, and a second positive discrete focal length different from the first positive discrete focal length in response to receiving circularly polarized light having the second rotational sense. Additionally, the second PB phase lens element may further provide the second negative discrete focal length and the second positive discrete focal length in response to a first control signal, and no focal length in response to a second control signal.

In another implementation of the first aspect, the plurality of discrete focal lengths may be evenly spaced apart. In another implementation of the first aspect, a distance between each consecutive pair of the plurality of discrete focal lengths may be less than or equal to the first continuous range of focal lengths.

In another implementation of the first aspect, the one or more first optical elements may be located between a light source that provides light to the composite lens system and the one or more second optical elements.

In another implementation of the first aspect, the one or more second optical elements may be located between a light source that provides light to the composite lens system and the one or more first optical elements. Additionally, the composite lens system may further include an HWP switch window and a QWP element located between the one or more second optical elements and the one or more first optical elements to convert circularly polarized light from the one or more second optical elements to a linearly polarized light. In another implementation of the first aspect, the composite lens system may further include an additional lens element that adds a fixed focal length to the combination of the selected first focal length and the selected discrete focal length. In some examples, the additional lens element may include a fixed lens. In some examples, the additional lens element may include a PB phase lens film.

In accordance with a second aspect of the present disclosure, a method may include applying, to a first light, a first focal length selected from a first continuous range of focal lengths, and applying, to a second light, a discrete focal length selected from a plurality of discrete focal lengths. Applying the selected first focal length and the selected discrete focal length in series may provide an output focal length based on a combination of the selected first focal length and the selected discrete focal length. In an implementation of the second aspect, the selected first focal length may be applied before the selected discrete focal length. In another implementation of the second aspect, the selected discrete focal length may be applied before the selected first focal length.

In accordance with a third aspect of the present disclosure, a composite lens system may include a first optical element, a second optical element optically coupled to the first optical element, and a third optical element optically coupled to the second optical element. The first optical element may provide a first negative discrete focal length in response to receiving circularly polarized light having a first rotational sense, and a first positive discrete focal length in response to receiving circularly polarized light have a second rotational sense opposite the first rotational sense. The second optical element may selectably convert a rotational sense of circularly polarized light received from the first optical element to an opposing rotational sense. The third optical element may provide a second negative discrete focal length different from the first negative discrete focal length in response to receiving circularly polarized light from the second optical element having the first rotational sense. The third optical element may also provide a second positive discrete focal length different from the first positive discrete focal length in response to receiving circularly polarized light from the second optical element having the second rotational sense.

BRIEF DESCRIPTION OF DRAWINGS

Aspects of the example disclosure are best understood from the following detailed description when read with the accompanying figures. Various features are not drawn to scale. Dimensions of various features may be arbitrarily increased or reduced for clarity of discussion.

DESCRIPTION

Figure 1:
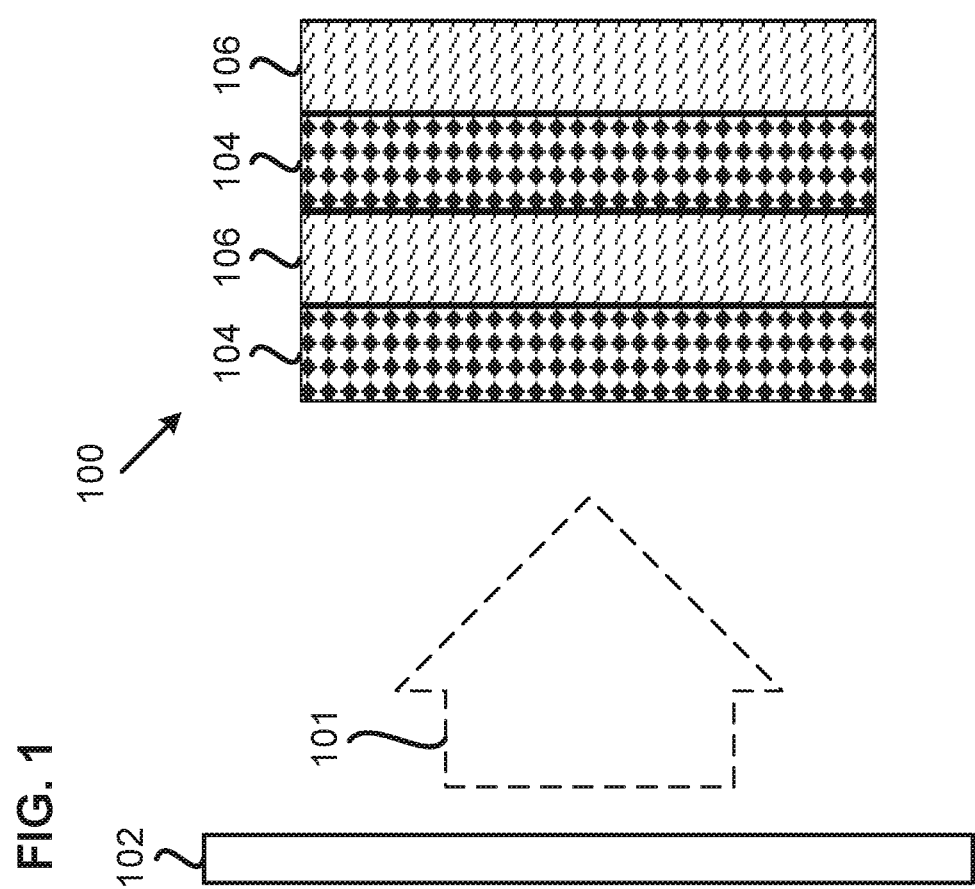
FIGS. 1-4 are side views of various composite lens systems including two PB-phase lenses, in accordance with example implementations of the present disclosure.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore will not be narrowly confined to what is shown in the figures.

The phrases "in one implementation" and "in some implementations" may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series, and equivalent.

Additionally, any two or more of the following paragraphs, (sub)-bullets, points, actions, behaviors, terms, alternatives, examples, or claims described in the following disclosure may be combined logically, reasonably, and properly to form a specific method. Any sentence, paragraph, (sub)-bullet, point, action, behavior, term, or claim described in the following disclosure may be implemented independently and separately to form a specific method. Dependency, e.g., "according to", "more specifically", "preferably", "in one embodiment", "in one implementation", "in one alternative", etc., in the following disclosure refers to just one possible example which would not restrict the specific method.

For explanation and non-limitation, specific details, such as functional entities, techniques, protocols, and standards, are set forth for providing an understanding of the described technology. In other examples, detailed description of well-known methods, technologies, systems, and architectures are omitted so as not to obscure the description with unnecessary details.

Also, while certain directional references (e.g., top, bottom, up, down, height, width, and so on) are employed in the description below and appended claims, such references are utilized to provide guidance regarding the positioning and dimensions of various elements relative to each other and are not intended to limit the orientation of the various embodiments to those explicitly discussed herein.

Various embodiments of a composite lens system that are described below employ a number of optical components, including the above-described PB-phase lens and/or LC GRIN lens, to provide a number of discrete, continuous, or near-continuous focal lengths covering a relatively wide focal length range. More specifically, various composite lens systems discussed hereinafter may include one or more of a PB-phase lens film, a "switched" PB-phase lens switch window (e.g., a PB-phase lens switch window (SW)), an LC GRIN lens, a static quarter-wave plate (QWP) (e.g., a QWP retardation film), a static half-wave plate (HWP) (e.g., an HWP retardation film), and a switched HWP (e.g., an HWP SW).

Generally, a film, such as a retardation film, is a static component that constantly performs its associated function, while a switch window is a controlled component that may selectively perform its associated function based on the state of one or more control signals, such as voltage signals. For example, as indicated above, a PB-phase lens film constantly performs its function of applying a focal length of +F or −F to the input circularly polarized light (e.g., depending on the rotational sense of the input light) to produce an output circularly polarized light of the opposing sense. In contrast, a PB-phase SW either provides this same functionality or allows the input circularly polarized light to pass through substantially unchanged (e.g., providing no change in focal length or rotational sense), depending on the state of its control signal. Consequently, a PB-phase switch window is capable of providing a focal length of +F, 0, or −F.

An HWP film (e.g., an HWP retardation film) constantly imposes a half-wave phase shift between orthogonal transverse components of light transmitted therethrough. As a result, an HWP film may be used to convert linearly polarized light to linearly polarized light rotated by 90 degrees, as well as convert circularly polarized light of one sense to circularly polarized light of the opposite sense (e.g., convert right-handed circularly polarized light to left-handed circularly polarized light, and vice-versa). An HWP SW, on the other hand, either performs this same function or allows the input light to pass therethrough substantially unchanged (e.g., unconverted) based on the state of a received control signal.

A quarter-wave plate (QWP) film (e.g., a quarter-wave retardation film) is an optical element that imposes a quarter-wave phase shift between orthogonal transverse components of light transmitted through the QWP. Consequently, a QWP film is typically employed to convert linearly polarized light to circularly polarized light, and to convert circularly polarized light to linearly polarized light.

Descriptions of several composite lens systems follow, as illustrated in FIGS. 1-23. In these descriptions, focal lengths are represented symbolically as +F1, −F1, +F2, −F2, and so on, where +F1 and −F1 have the same absolute value, and +F1 and +F2 are associated with different components and may or may not have the same value. Further, each focal length is associate with a corresponding optical power provided by the associated component.

FIGS. 1-4 are side views of various composite lens systems including two PB-phase lenses, in accordance with example implementations of the present disclosure. For example, FIG. 1 is a side view of a composite lens system 100. In FIG. 1 and subsequent drawings described below, a display 102 emits light 101 toward a display side of a composite lens system. The composite lens system processes the received light 101 to produce light having a controllable focal length. In some examples, display 102 may be a display panel of an artificial reality (e.g., virtual reality) head-mounted display (HMD). In such examples, controlling the focal length of the composite lens system may enable use of the HMD by a user without the aid of corrective lenses that the user may otherwise require. Many other applications in which the various composite lens systems disclosed herein may be employed are also possible. Light 101 may be circularly polarized or linearly polarized, based on the particular example being discussed below.

In FIG. 1, composite lens system 100 includes, in an order encountered by light 101, a first HWP SW 104, a first PB-phase lens film 106, a second HWP SW 104, and a second PB-phase lens film 106. In some embodiments, composite lens system 100 presumes light 101 is circularly polarized. In other examples in which light 101 is linearly polarized, a QWP film may be included on the display 102 side of composite lens system 100 to convert light 101 to circularly polarized light 101 for use by first HWP SW 104.

First PB-phase lens film 106 provides a focal length of +F1 or −F1, depending on the input polarization state of the light it receives. Similarly, second PB-phase lens film 106 provides a focal length of −F2 or +F2, depending on the input polarization state of the light it receives.

In this configuration, first HWP SW 104, depending on the state of its control signal, can pass light 101 with either circular polarization sense (e.g., left-hand or right-hand circular polarization) to first PB-phase lens film 106. In other words, first HWP SW 104 selects the circular polarization state for the light incident on first PB-phase lens film 106, which in turn determines the sign of the focal length (+F1 or −F1) that first PB-phase lens film 106 imposes on that light. Similarly, second HWP SW 104 selects the circular polarization state for the light incident on second PB-phase lens film 106, which in turn determines the sign of the focal length (+F2 or −F2) that second PB-phase lens film 106 imposes on the light it receives.

Consequently, composite lens system 100 may provide up to four discrete focal states (e.g., −F1−F2, −F1+F2, +F1−F2, and +F1+F2). Further, in circumstances in which F1=2×F2 or F2=2×F1, the focal lengths of the four discrete focal states will be equally spaced in focal length or optical power. More specifically, if F1=2×F2, the four focal states are −3×F2, −F2, +F2, and +3×F2. If, instead, F2=2×F1, the four focal states are −3×F1, −F1, +F1, and +3×F1.

Some or all of the optical components of composite lens system 100 may be separated by an air gap or may be bonded with an optical adhesive. Further, the placement of first and second PB-phase lens films 106 within composite lens system 100 may be swapped in other examples while providing the same functionality.

Figure 2:
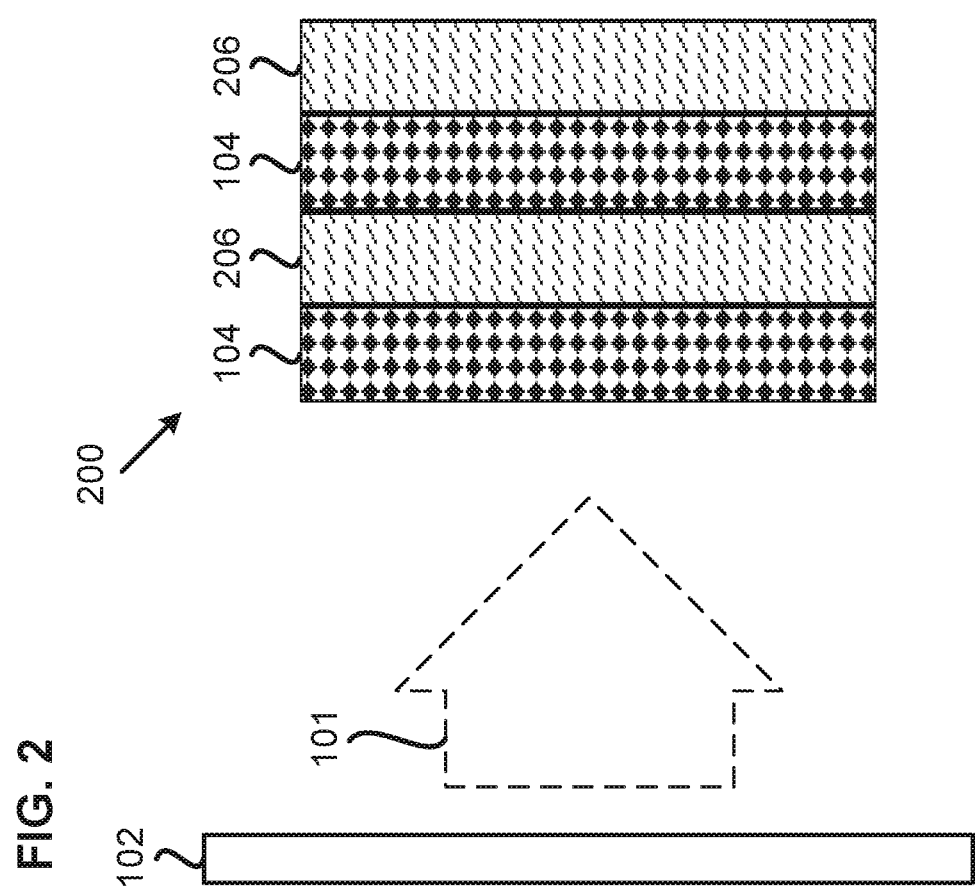

FIG. 2 is a side view of a composite lens system 200 that includes, in an order encountered by light 101, a first HWP SW 104, a first PB-phase lens SW 206, a second HWP SW 104, and a second PB-phase lens SW 206. In some embodiments, composite lens system 200 presumes light 101 is circularly polarized. In other examples in which light 101 is linearly polarized, a QWP film may be included on the display 102 side of composite lens system 200 to convert light 101 to circularly polarized light 101 for use by first HWP SW 104.

First PB-phase lens SW 206 provides a focal length of +F1, 0, or −F1, depending on the state of its control signal (e.g., whether first PB-phase lens SW 206 is set to a focusing state) and the input polarization state of the light it receives, as described above. Similarly, second PB-phase lens SW 206 provides a focal length of −F2, 0, or +F2, depending on the state of its control signal and the input polarization state of the light it receives.

In this configuration, first HWP SW 104 selects the circular polarization state for the light incident on first PB-phase lens SW 206, which in turn determines the sign of the focal length (+F1 or −F1) that first PB-phase lens SW 206 imposes on that light when first PB-phase lens SW 206 is set by a control signal to a focusing state. Similarly, second HWP SW 104 selects the circular polarization state for the light incident on second PB-phase lens SW 206, which in turn determines the sign of the focal length (+F2 or −F2) that second PB-phase lens SW 206 imposes on the light it receives when second PB-phase lens SW 206 is set by a control signal to a focusing state.

Consequently, composite lens system 200 may provide up to nine discrete focal states (e.g., −F1−F2, −F1, −F1+F2, −F2, 0, +F2, +F1−F2, +F1, and +F1+F2). Further, in circumstances in which F1=3×F2 or F2=3×F1, the focal lengths of the nine discrete focal states will be equally spaced in focal length. More specifically, if F1=3×F2, the nine focal states are −4×F2, −3×F2, −2×F2, −F2, 0, +F2, +2×F2, +3×F2, and +4×F2. If, instead, F2=3×F1, the nine focal states are −4×F1, −3×F1, −2×F1, −F1, 0, +F1, +2×F1, +3×F1, and +4×F1.

Some or all of the optical components of composite lens system 200 may be separated by an air gap or may be bonded with an optical adhesive. Further, the placement of first and second PB-phase lens SW 206 within composite lens system 200 may be swapped in other examples while providing the same functionality.

Figure 3:
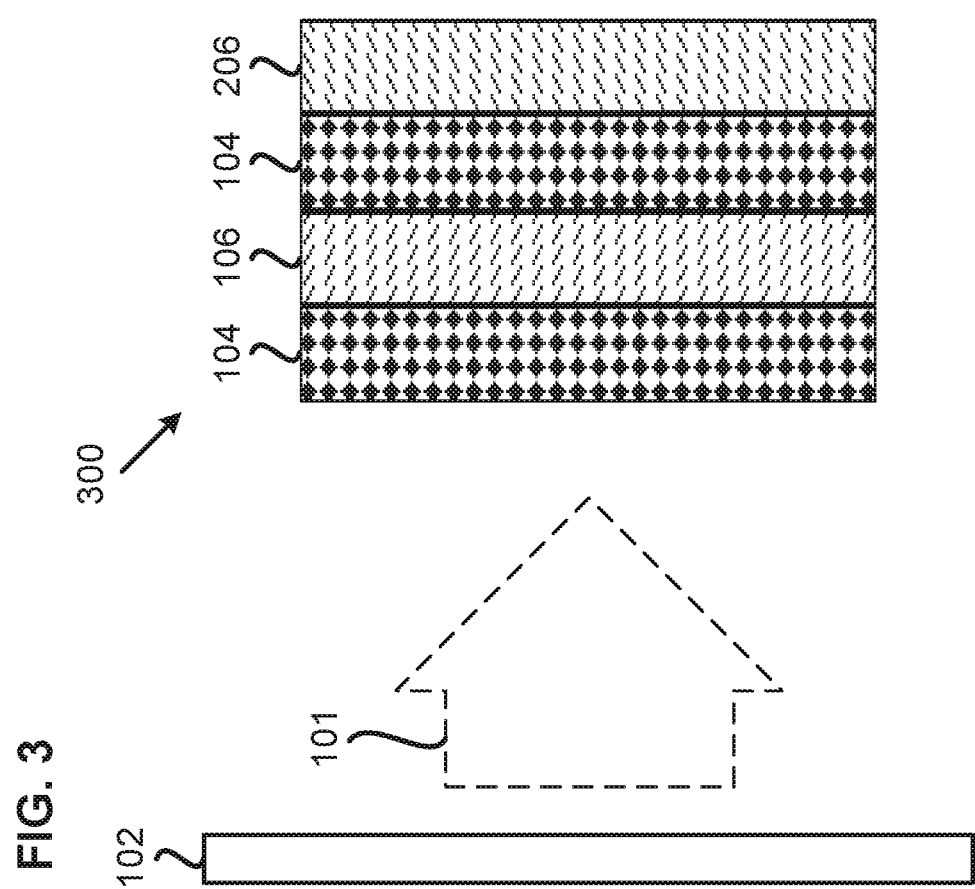

FIG. 3 is a side view of a composite lens system 300 that includes, in an order encountered by light 101, a first HWP SW 104, a PB-phase lens film 106, a second HWP SW 104, and a PB-phase lens SW 206. In some embodiments, composite lens system 300 presumes light 101 is circularly polarized. In other examples in which light 101 is linearly polarized, a QWP film may be included on the display 102 side of composite lens system 300 to convert light 101 to circularly polarized light 101 for use by first HWP SW 104.

PB-phase lens film 106 provides a focal length of +F1 or −F1, depending on the input polarization state of the light it receives. PB-phase lens SW 206 provides a focal length of −F2, 0, or +F2, depending on the state of its control signal and the input polarization state of the light it receives.

In this configuration, first HWP SW 104 selects the circular polarization state for the light incident on PB-phase lens film 106, which in turn determines the sign of the focal length (+1 or −F1) that PB-phase lens film 106 imposes on that light. Similarly, second HWP SW 104 selects the circular polarization state for the light incident on PB-phase lens SW 206, which in turn determines the sign of the focal length (+F2 or −F2) that second PB-phase lens film 106 imposes on the light it receives when PB-phase lens SW 206 is set by a control signal to a focusing state.

Consequently, composite lens system 300 may provide up to six discrete focal states (e.g., −F1−F2, −F1, −F1+F2, +F1−F2, +F1, and +F1+F2). Further, in circumstances in which 2×F1=3×F2 or 2×F2=3×F1, the focal lengths of the six discrete focal states will be equally spaced in focal length. More specifically, if 2×F1=3×F2, the six focal states are −2.5×F2, −1.5×F2, −0.5×F2, +0.5×F2, +1.5×F2, and +2.5×F2. If, instead, 2×F2=3×F1, the six focal states are −2.5×F1, −1.5×F1, −0.5×F1, +0.5×F1, +1.5×F1, and +2.5×F1.

Some or all of the optical components of composite lens system 300 may be separated by an air gap or may be bonded with an optical adhesive. Further, the placement of PB-phase lens film 106 and PB-phase lens SW 206 within composite lens system 300 may be swapped in other examples while providing the same functionality.

Figure 4:
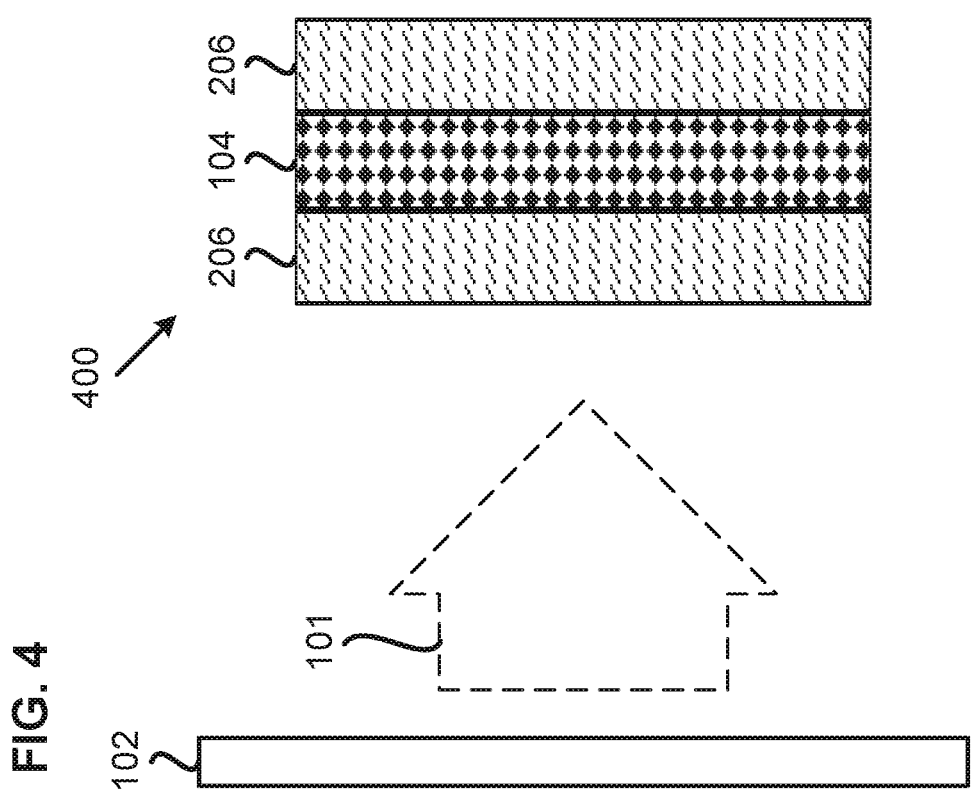

FIG. 4 is a side view of a composite lens system 400 that includes, in an order encountered by light 101, a first PB-phase lens SW 206, an HWP SW 104, and a second PB-phase lens SW 206. In some embodiments, composite lens system 400 presumes light 101 is circularly polarized. In other examples in which light 101 is linearly polarized, a QWP film may be included on the display 102 side of composite lens system 400 to convert light 101 to circularly polarized light 101 for use by first PB-phase lens SW 206.

First PB-phase lens SW 206 provides a focal length of +F1, 0, or −F1, depending on the state of its control signal (e.g., whether first PB-phase lens SW 206 is set to a focusing state) and the input polarization state of the light it receives, as described above. Second PB-phase lens SW 206 provides a focal length of −F2, 0, or +F2, depending on the state of its control signal and the input polarization state of the light it receives.

In this configuration, since first PB-phase lens SW 206 is not preceded by an HWP SW 104, as was the case in embodiments described above, first PB-phase lens SW 206, when set to a focusing state, provides a focal length of either +F1 or −F1, but not both, as the circular polarization of light 101 received from display 102 is presumably unchangeable. HWP SW 104 selects the circular polarization state for the light incident on second PB-phase lens SW 206, which in turn determines the sign of the focal length (+F2 or −F2) that second PB-phase lens SW 206 imposes on the light it receives when second PB-phase lens SW 206 is set by control signal to a focusing state.

Consequently, composite lens system 400 may provide up to six discrete focal states (e.g., −F1−F2, −F1, −F1+F2, −F2, 0, and +F2 for a first polarization state of light 101, or +F1−F2, +F1, +F1+F2, −F2, 0, and +F2 for a second polarization state of light 101). Further, in circumstances in which F1=3×F2 or F2=3×F1, the focal lengths of the six discrete focal states will be equally spaced in lens power or focal length. More specifically, if F1=3×F2, the six focal states are −4×F2, −3×F2, −2×F2, −F2, 0, and +F2 for the first polarization state of light 101, or −F2, 0, +F2, +2×F2, +3×F2, and +4×F2 for the second polarization of light 101. If, instead, F2=3×F1, the six focal states are −4×F1, −3×F1, −2×F1, −F1, 0, and +F1 for the first polarization state of light 101, or −F1, 0, +F1, +2×F1, +3×F1, and +4×F1 for the second polarization of light 101. In these particular embodiments, the set of possible discrete focal lengths is not balanced about the focal length of 0, which may be beneficial in some applications.

Some or all of the optical components of composite lens system 400 may be separated by an air gap or may be bonded with an optical adhesive. Further, the placement of first and second PB-phase lens SW 206 within composite lens system 400 may be swapped in other examples while providing the same functionality.

Figure 5:
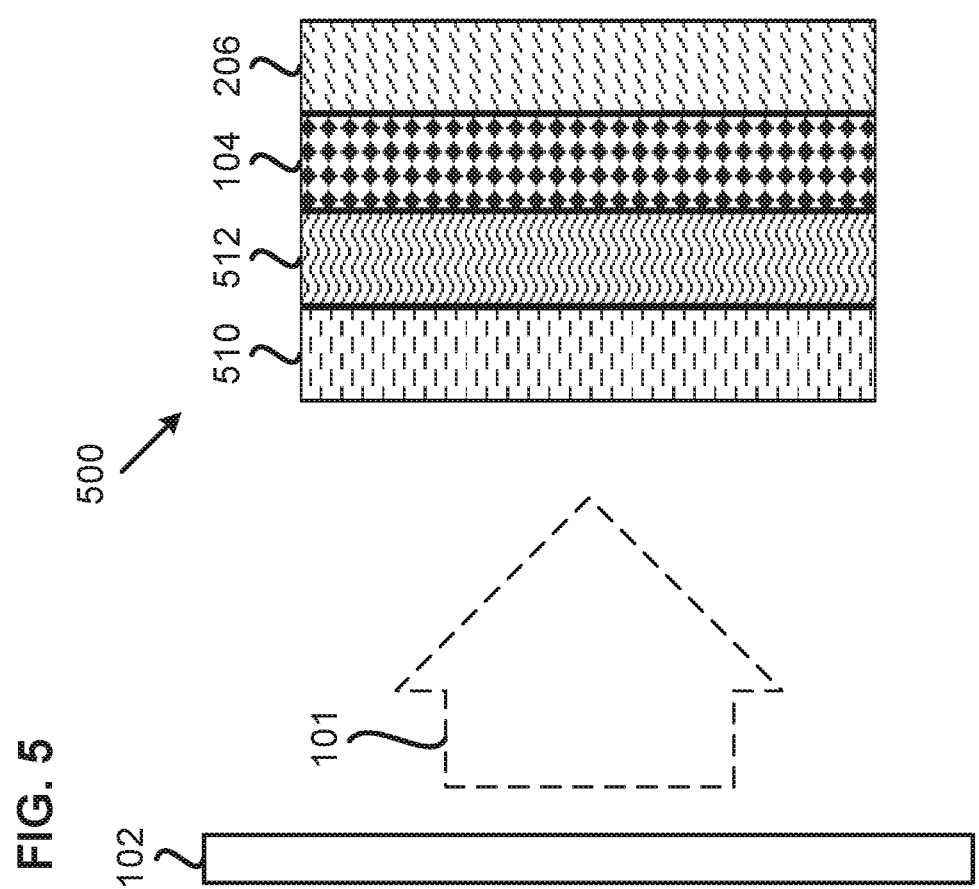
FIGS. 5-7 are side views of various composite lens systems including one PB-phase lens and one LC GRIN lens, in accordance with example implementations of the present disclosure.
Figure 6:
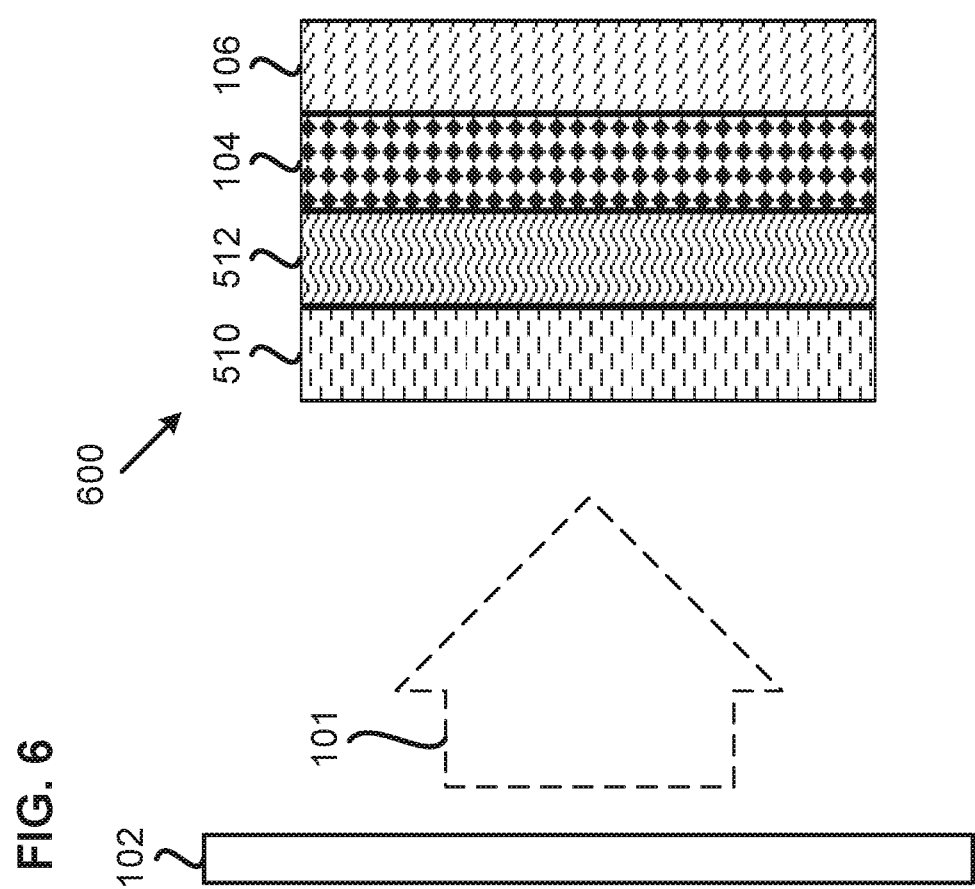
Figure 7:
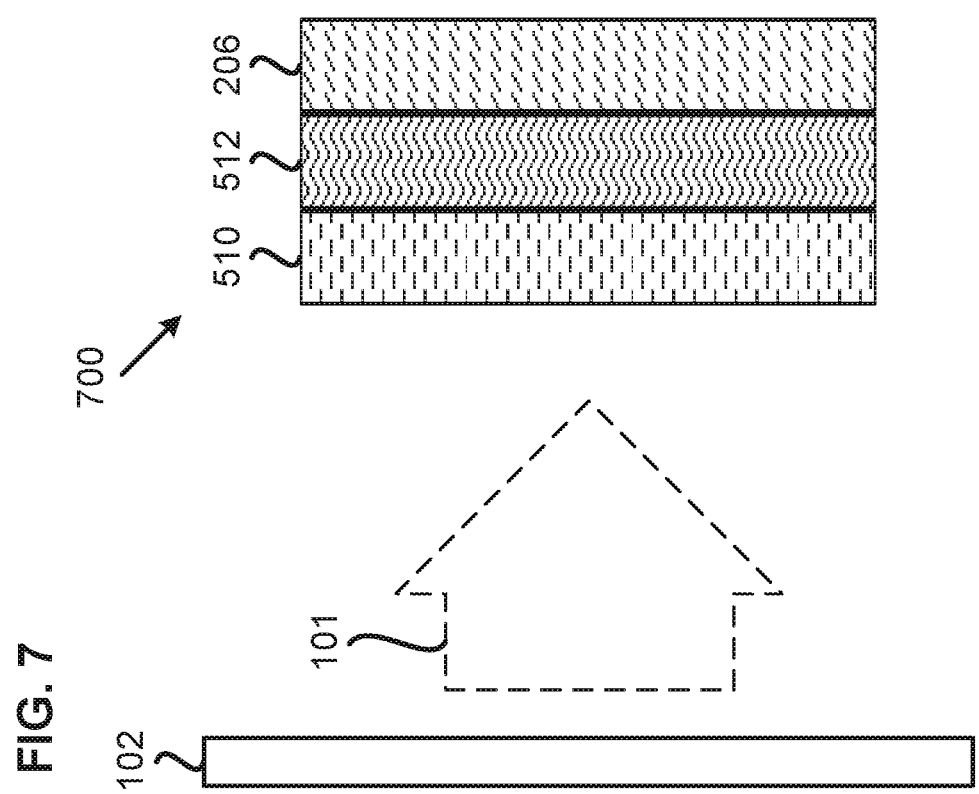

FIGS. 5-7 are side views of various composite lens systems including one PB-phase lens and one LC GRIN lens, in accordance with example implementations of the present disclosure. For example, FIG. 5 is a side view of a composite lens system 500 that includes, in an order encountered by light 101, an LC GRIN lens 510, a QWP film 512, an HWP SW 104, and a PB-phase lens SW 206. As shown, composite lens system 500 presumes light 101 is linearly polarized in a particular direction compatible with LC GRIN lens 510. In other examples in which light 101 is circularly polarized, an additional QWP film may be included on the display 102 side of composite lens system 500 to convert light 101 to linearly polarized light 101 for use by LC GRIN lens 510.

LC GRIN lens 510, based on one or more control signals provided thereto, may provide a focal length within a continuous or near-continuous range of −F1 to +F1, as discussed earlier, to light 101 received from display 102. PB-phase lens SW 206 provides a focal length of +F2, 0, or −F2, depending on the state of its control signal (e.g., whether first PB-phase lens SW 206 is set to a focusing state) and the input polarization state of the light it receives.

In this configuration, QWP film 512 converts linearly polarized light received from LC GRIN lens 510 to circularly polarized light for use by PB-phase lens SW 206. Further, HWP SW 104 selects the circular polarization state for the light incident on PB-phase lens SW 206, which in turn determines the sign of the focal length (+F2 or −F2) that PB-phase lens SW 206 imposes on the light it receives when PB-phase lens SW 206 is set to a focusing state.

Consequently, composite lens system 500 may provide three focal length ranges (e.g., −F2−F1 to −F2+F1, −F1 to +F1, and +F2−F1 to +F2+F1). Further, in circumstances in which F2=2×F1, the focal length ranges are −3×F1 to −F1, −F1 to +F1, and +F1 to +3×F1, resulting in a single continuous or near-continuous focal length range of −3×F1 to +3×F1.

Some or all of the optical components of composite lens system 500 may be separated by an air gap or may be bonded with an optical adhesive. Further, in other embodiments, LC GRIN lens 510 may be placed on the non-display 102 side of PB-phase lens SW 206 to provide the same functionality. In such embodiments, a second HWP SW 104 and a second QWP film 512 may be placed between PB-phase lens SW 206 and LC GRIN lens 510 to convert the circular polarization of light from PB-phase lens SW 206 to linear polarization for LC GRIN lens 510.

FIG. 6 is a side view of a composite lens system 600 that includes, in an order encountered by light 101, an LC GRIN lens 510, a QWP film 512, an HWP SW 104, and a PB-phase lens film 106. As shown, composite lens system 600 presumes light 101 is linearly polarized in a particular direction compatible with LC GRIN lens 510. In other examples in which light 101 is circularly polarized, an additional QWP film may be included on the display 102 side of composite lens system 600 to convert light 101 to linearly polarized light 101 for use by LC GRIN lens 510.

LC GRIN lens 510, based on one or more control signals provided thereto, may provide a focal length within a continuous or near-continuous range of −F1 to +F1 to light 101 received from display 102. PB-phase lens film 106 provides a focal length of +F2 or −F2, depending on the input polarization state of the light it receives.

In this configuration, QWP film 512 converts linearly polarized light received from LC GRIN lens 510 to circularly polarized light for use by PB-phase lens film 106. Further, HWP SW 104 selects the circular polarization state for the light incident on PB-phase lens film 106, which in turn determines the sign of the focal length (+F2 or −F2) that second PB-phase lens film 106 imposes on the light it receives.

Consequently, composite lens system 600 may provide two focal length ranges (e.g., −F2−F1 to −F2+F1 and +F2−F1 to +F2+F1). Further, in circumstances in which F2=F1, the focal length ranges are −2×F1 to 0 and 0 to +2×F1, resulting in a single continuous or near-continuous focal length range of −2×F1 to +2×F1.

Some or all of the optical components of composite lens system 600 may be separated by an air gap or may be bonded with an optical adhesive. Further, in other embodiments, LC GRIN lens 510 may be placed on the non-display 102 side of PB-phase lens film 106 to provide the same functionality. In such embodiments, a second HWP SW 104 and a second QWP film 512 may be placed between PB-phase lens film 106 and LC GRIN lens 510 to convert the circular polarization of light from PB-phase lens film 106 to linear polarization for LC GRIN lens 510.

FIG. 7 is a side view of a composite lens system 700 that includes, in an order encountered by light 101, an LC GRIN lens 510, a QWP film 512, and a PB-phase lens SW 206. As shown, composite lens system 700 presumes light 101 is linearly polarized in a particular direction compatible with LC GRIN lens 510. In other examples in which light 101 is circularly polarized, an additional QWP film may be included on the display 102 side of composite lens system 700 to convert light 101 to linearly polarized light 101 for use by LC GRIN lens 510.

LC GRIN lens 510, based on one or more control signals provided thereto, may provide a focal length within a continuous or near-continuous range of −F1 to +F1 to light 101 received from display 102. PB-phase lens SW 206 provides a focal length of +F2 or −F2, depending on the input polarization state of the light it receives.

In this configuration, QWP film 512 converts linearly polarized light received from LC GRIN lens 510 to circularly polarized light for use by PB-phase lens SW 106. Since PB-phase lens SW 206 is not preceded by an HWP SW 104, PB-phase lens SW 206, when set to a focusing state, provides a focal length of either +F1 or −F1, but not both, as the circular polarization of light 101 received from QWP film 512, as originated by panel 102, is unchangeable.

Consequently, composite lens system 700 may provide two focal ranges for each polarization state of light 101 (e.g., −F2−F1 to −F2+F1 and −F1 to +F1 for a first polarization state of light 101, or −F1 to +F1 and +F2−F1 to +F2+F1 for a second polarization state of light 101). Further, in circumstances in which F2=2×F1, the focal length ranges are −3×F1 to −F1 and −F1 to +F1, thus providing a single continuous or near-continuous focal length range of −3×F1 to +F1 for the first polarization of light 101. For the second polarization of light 101, the focal length ranges are −F1 to +F1 and +F1 to +3×F1, thus providing a single continuous or near-continuous focal length range of −F1 to +3×F1. In these particular embodiments, the focal length ranges are not balanced about the focal length of 0, which may be beneficial in some applications.

Some or all of the optical components of composite lens system 700 may be separated by an air gap or may be bonded with an optical adhesive. Further, in other embodiments, LC GRIN lens 510 may be placed on the non-display 102 side of PB-phase lens SW 206 to provide the same functionality. In such embodiments, an HWP SW 104 and a second QWP film 512 may be placed between PB-phase lens SW 206 and LC GRIN lens 510 to convert the circular polarization of light from PB-phase lens SW 206 to linear polarization for LC GRIN lens 510.

Figure 8:
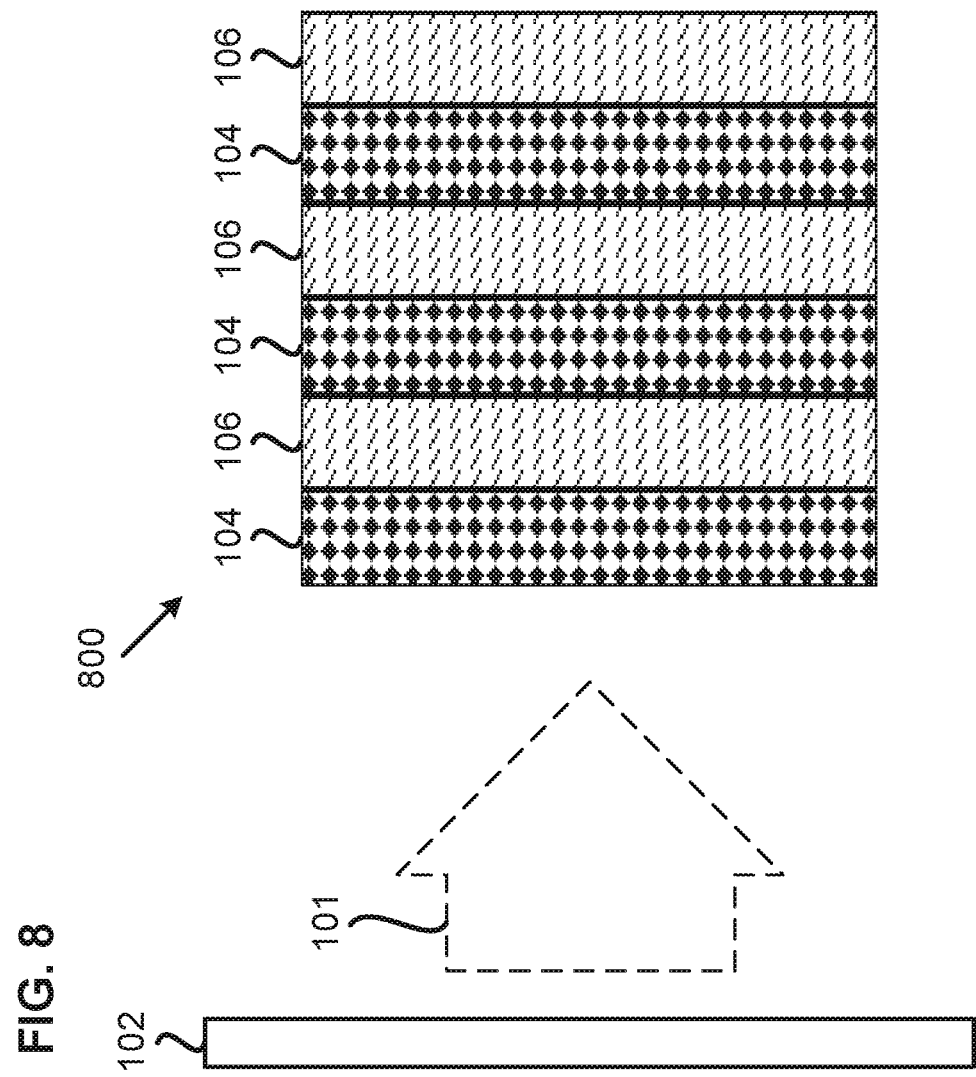
FIGS. 8-13 are side views of various composite lens systems including three PB-phase lenses, in accordance with example implementations of the present disclosure.
Figure 9:
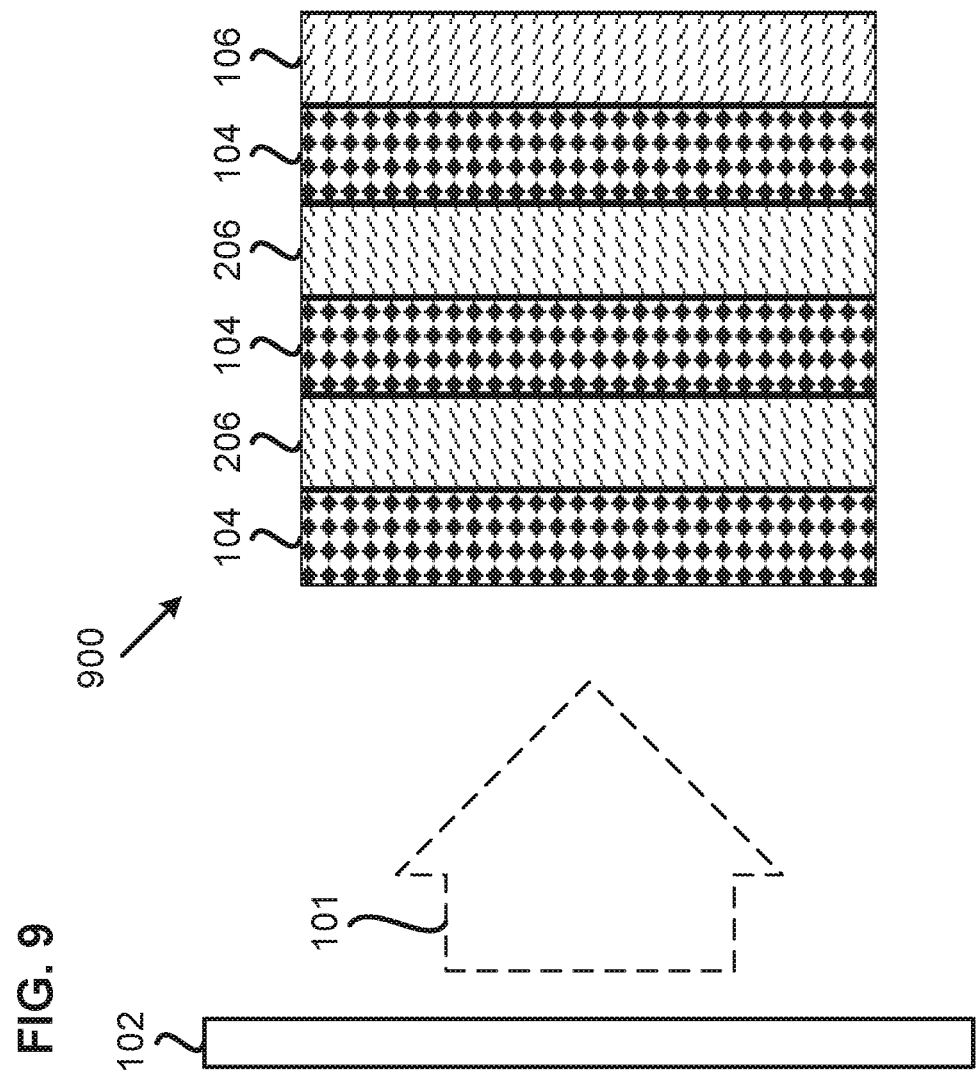
Figure 10:
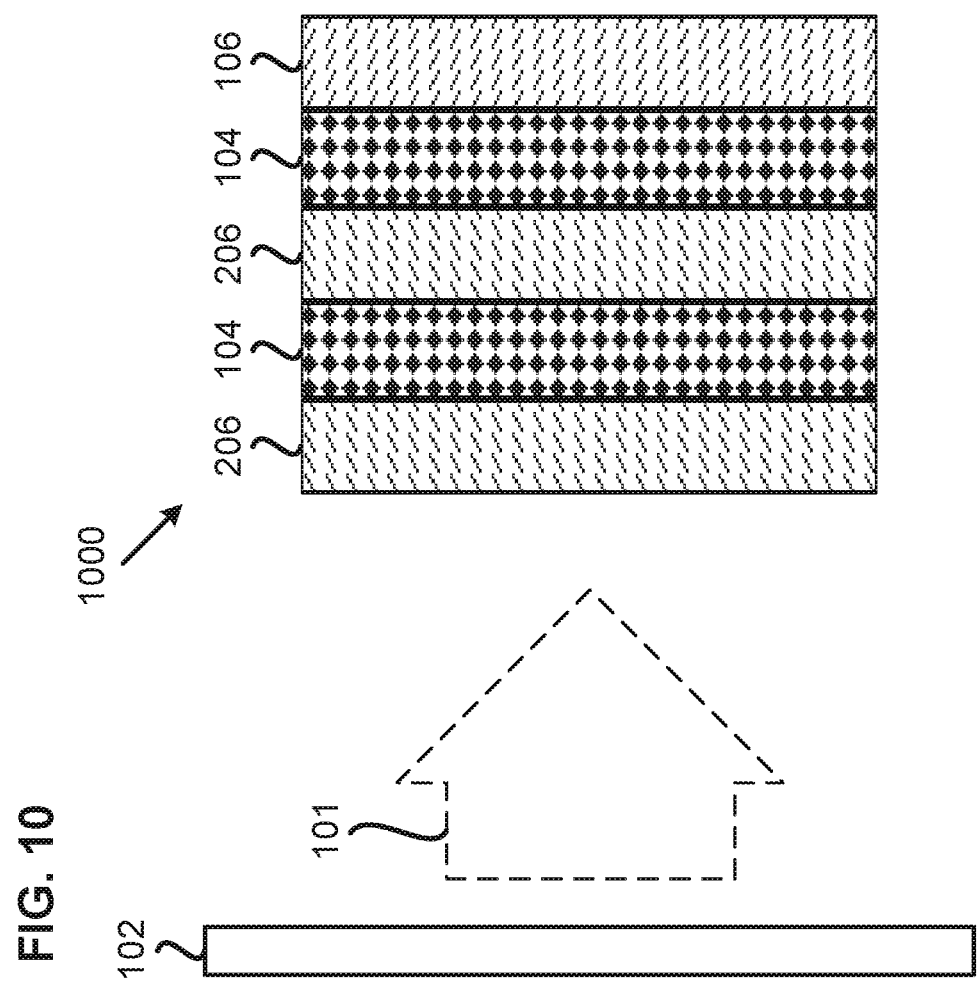
Figure 11:
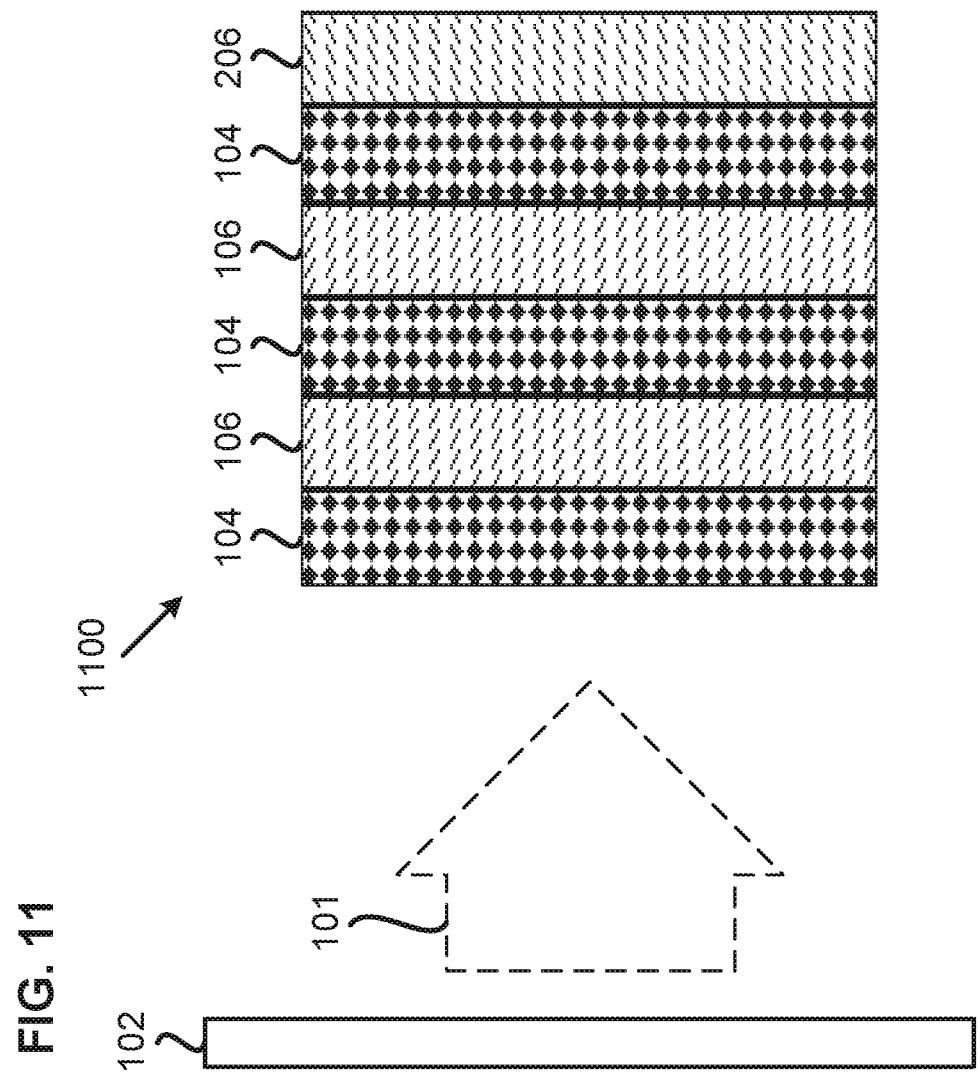
Figure 12:
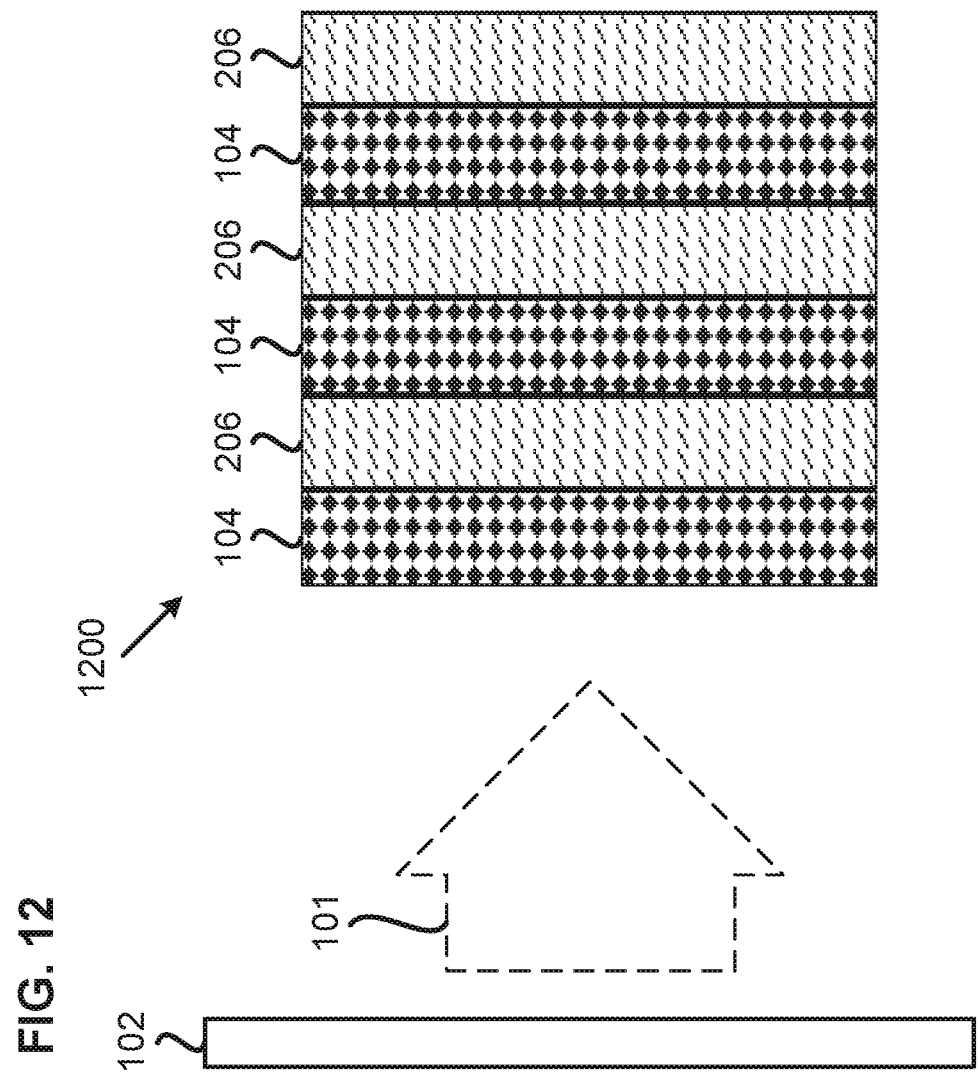
Figure 13:
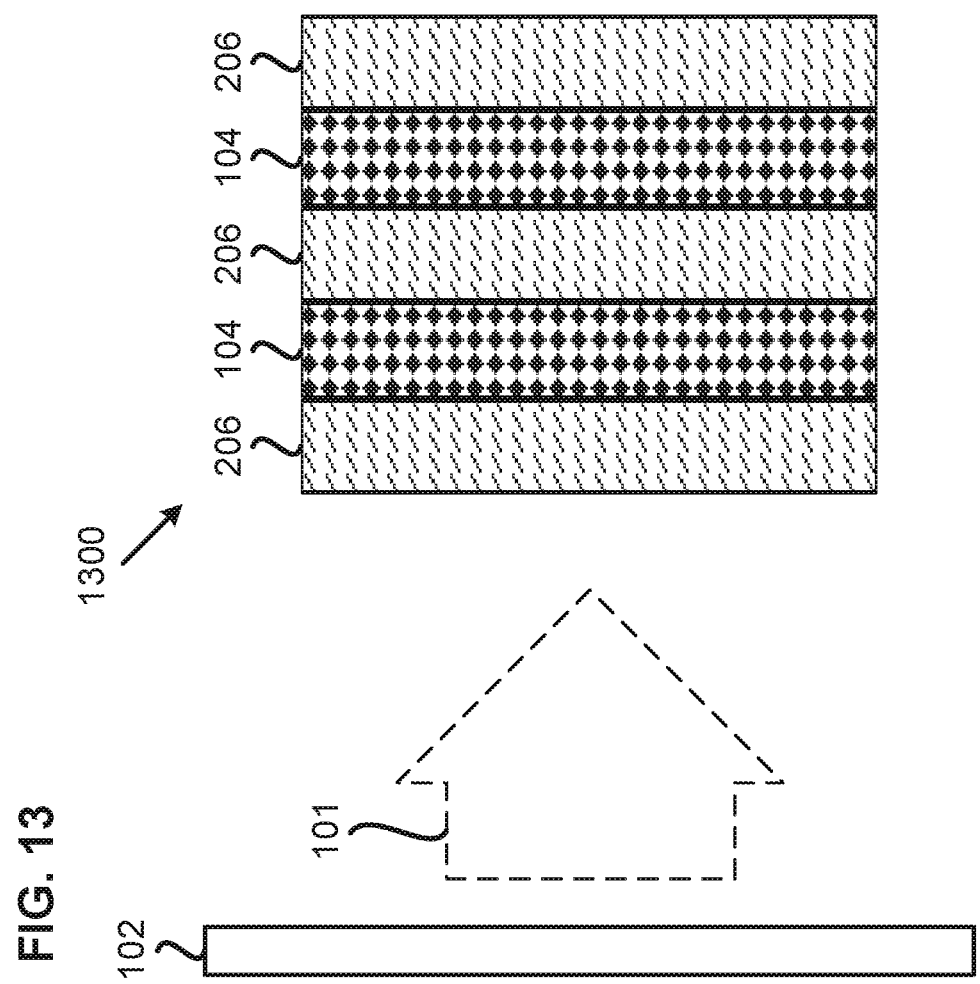

FIGS. 8-13 are side views of various composite lens systems including three PB-phase lenses, in accordance with example implementations of the present disclosure. More specifically, FIGS. 8, 9, and 10 are based on the systems of FIGS. 1, 2, and 4, respectively, with an additional HWP SW 104 and PB-phase lens film 106, while FIGS. 11, 12, and 13 are based on the systems of FIGS. 1, 2, and 4, respectively, with an additional HWP SW 104 and PB-phase lens SW 206.

For example, FIG. 8 is a side view of a composite lens system 800 that includes, in an order encountered by light 101, a first HWP SW 104, a first PB-phase lens film 106, a second HWP SW 104, and a second PB-phase lens film 106 (e.g., as depicted in FIG. 1 for composite lens system 100), along with a third HWP SW 104 and a third PB-phase lens film 106. In some embodiments, composite lens system 800 presumes light 101 is circularly polarized. In other examples in which light 101 is linearly polarized, a QWP film may be included on the display 102 side of composite lens system 800 to convert light 101 to circularly polarized light 101 for use by first HWP SW 104.

As shown in FIG. 8, first PB-phase lens film 106 provides a focal length of +F1 or −F1, and second PB-phase lens film 106 provides a focal length of −F2 or +F2, depending on the input polarization state of the light they receive. Similarly, third PB-phase lens film 106 provides a focal length of +F3 or −F3, depending on the input polarization state of the light it receives.

In this configuration, first HWP SW 104 selects the circular polarization state for the light incident on first PB-phase lens film 106, which in turn determines the sign of the focal length (+F1 or −F1) that first PB-phase lens film 106 imposes on that light. Similarly, second HWP SW 104 selects the circular polarization state for the light incident on second PB-phase lens film 106, which in turn determines the sign of the focal length (+F2 or −F2) that second PB-phase lens film 106 imposes on the light it receives. Finally, third HWP SW 104 selects the circular polarization state for the light incident on third PB-phase lens film 106, which in turn determines the sign of the focal length (+F3 or −F3) that third PB-phase lens film 106 imposes on the light it receives.

Consequently, composite lens system 800 may provide up to eight discrete focal states (e.g., −F1−F2−F3, −F1−F2+F3, −F1+F2−F3, −F1+F2+F3, F1−F2−F3, F1−F2+F3, F1+F2−F3, and F1+F2+F3). Further, in circumstances in which, for example, F1=2×F2=4×F3, the focal lengths of the eight discrete focal states will be equally spaced in lens power or focal length (e.g., at −7×F3, −5×F3, −3×F3, −F3, +F3, +3×F3, +5×F3, and +7×F3). Other ratios between F1, F2, and F3 resulting in equally spaced focal length states are also possible.

Some or all of the optical components of composite lens system 800 may be separated by an air gap or may be bonded with an optical adhesive. Further, the placement of first, second, and third PB-phase lens films 106 within composite lens system 800 may be swapped in other examples while providing the same functionality.

FIG. 9 is a side view of a composite lens system 900 that includes, in an order encountered by light 101, a first HWP SW 104, a first PB-phase lens SW 206, a second HWP SW 104, and a second PB-phase lens SW 206 (e.g., as shown in FIG. 2), along with a third HWP SW 104 and a PB-phase lens film 106. In some embodiments, composite lens system 900 presumes light 101 is circularly polarized. In other examples in which light 101 is linearly polarized, a QWP film may be included on the display 102 side of composite lens system 900 to convert light 101 to circularly polarized light 101 for use by first HWP SW 104.

First PB-phase lens SW 206 provides a focal length of +F1, 0, or −F1, depending on the state of its control signal (e.g., whether first PB-phase lens SW 206 is set to a focusing state) and the input polarization state of the light it receives, as described above. Similarly, second PB-phase lens SW 206 provides a focal length of −F2, 0, or +F2, depending on the state of its control signal and the input polarization state of the light it receives. Finally, PB-phase lens film 106 provides a focal length of +F3 or −F3, depending on the input polarization state of the light it receives.

In this configuration, first HWP SW 104 selects the circular polarization state for the light incident on first PB-phase lens SW 206, which in turn determines the sign of the focal length (+F1 or −F1) that first PB-phase lens SW 206 imposes on that light when first PB-phase lens SW 206 is set to a focusing state. Similarly, second HWP SW 104 selects the circular polarization state for the light incident on second PB-phase lens SW 206, which in turn determines the sign of the focal length (+F2 or −F2) that second PB-phase lens SW 206 imposes on the light it receives when second PB-phase lens SW 206 is set to a focusing state. Finally, third HWP SW 104 selects the circular polarization state for the light incident on PB-phase lens film 106, which in turn determines the sign of the focal length (+F3 or −F3) that PB-phase lens film 106 imposes on the light it receives.

Consequently, composite lens system 900 may provide up to eighteen discrete focal states (e.g., −F1−F2−F3, −F1−F2+F3, −F1−F3, −F1+F3, −F1+F2−F3, −F1+F2+F3, −F2−F3, −F2+F3, −F3, +F3, +F2−F3, +F2+F3, +F1−F2−F3, +F1−F2+F3, +F1−F3, +F1+F3, +F1+F2−F3, and +F1+F2+F3). Further, in circumstances in which, for example, F1=3× F2=12×F3, the focal lengths of the eighteen discrete focal states will be equally spaced in lens power or focal length (e.g., at −17×F3, −15×F3, −13×F3, −11×F3, −9×F3, −7×F3, −5×F3, −3×F3, −F3, +F3, +3×F3, +5×F3, +7×F3, +9×F3, +11×F3, +13×F3, +15×F3, and +17×F3). Other ratios between F1, F2, and F3 resulting in equally spaced focal length states are also possible.

Some or all of the optical components of composite lens system 900 may be separated by an air gap or may be bonded with an optical adhesive. Further, the placement of first and second PB-phase lens SW 206, as well as PB-phase lens film 106, within composite lens system 900 may be swapped in other examples while providing the same functionality.

FIG. 10 is a side view of a composite lens system 1000 that includes, in an order encountered by light 101, a first PB-phase lens SW 206, a first HWP SW 104, and a second PB-phase lens SW 206 (e.g., as shown in FIG. 4), along with a second HWP SW 104 and a PB-phase lens film 106. In some embodiments, composite lens system 1000 presumes light 101 is circularly polarized. In other examples in which light 101 is linearly polarized, a QWP film may be included on the display 102 side of composite lens system 1000 to convert light 101 to circularly polarized light 101 for use by first PB-phase lens SW 206.

First PB-phase lens SW 206 provides a focal length of +F1, 0, or −F1, depending on the state of its control signal (e.g., whether first PB-phase lens SW 206 is set to a focusing state) and the input polarization state of the light it receives, as described above. Second PB-phase lens SW 206 provides a focal length of −F2, 0, or +F2, depending on the state of its control signal and the input polarization state of the light it receives. Also, PB-phase lens film 106 provides a focal length of +F3 or −F3, depending on the input polarization state of the light it receives.

In this configuration, since first PB-phase lens SW 206 is not preceded by an HWP SW 104, first PB-phase lens SW 206, when set to a focusing state, provides a focal length of either +F1 or −F1, but not both, as the circular polarization of light 101 received from display 102 is presumably unchangeable. First HWP SW 104 selects the circular polarization state for the light incident on second PB-phase lens SW 206, which in turn determines the sign of the focal length (+F2 or −F2) that second PB-phase lens SW 206 imposes on the light it receives when PB-phase lens SW 206 is set to a focusing state. Finally, second HWP SW 104 selects the circular polarization state for the light incident on PB-phase lens film 106, which in turn determines the sign of the focal length (+F3 or −F3) that PB-phase lens film 106 imposes on the light it receives.

Consequently, composite lens system 1000 may provide up to twelve discrete focal states (e.g., −F1−F2−F3, −F1−F2+F3, −F1−F3, −F1+F3, −F1+F2−F3, −F1+F2+F3, −F2−F3, −F2+F3, −F3, +F3, F2−F3, and F2+F3 for a first polarization state of light 101, or F1−F2−F3, F1−F2+F3, F1−F3, F1+F3, F1+F2−F3, F1+F2+F3, −F2−F3, −F2+F3, −F3, +F3, F2−F3, and F2+F3 a second polarization state of light 101). Further, in circumstances in which, for example, F1=3×F2=12×F3, the focal lengths of the twelve discrete focal states will be equally spaced in lens power or focal length (e.g., at −17×F3, −15×F3, −13×F3, −11×F3, −9×F3, −7×F3, −5×F3, −3×F3, −F3, F3, 3×F3, and 5×F3 for the first polarization state of light 101, or at −5×F3, −3×F3, −F3, F3, 3×F3, 5×F3, 7×F3, 9×F3, 11×F3, 13×F3, 15×F3, and 17×F3 for the second polarization state of light 101). Other ratios between F1, F2, and F3 resulting in equally spaced focal length states are also possible. In these particular embodiments, the set of possible discrete focal lengths is not balanced about the focal length of 0, which may be beneficial in some applications.

Some or all of the optical components of composite lens system 1000 may be separated by an air gap or may be bonded with an optical adhesive. Further, the placement of first and second PB-phase lens SW 206, as well as PB-phase lens film 106, within composite lens system 1000 may be swapped in other examples while providing the same functionality.

As indicated above, FIGS. 11-13 are based on the systems of FIGS. 1, 2, and 4, respectively, with an additional HWP SW 104 and PB-phase lens SW 206. For example, FIG. 11 is a side view of a composite lens system 1100 that includes, in an order encountered by light 101, a first HWP SW 104, a first PB-phase lens film 106, a second HWP SW 104, and a second PB-phase lens film 106 (e.g., as depicted in FIG. 1 for composite lens system 100), along with a third HWP SW 104 and a PB-phase lens SW 206. In some embodiments, composite lens system 1100 presumes light 101 is circularly polarized. In other examples in which light 101 is linearly polarized, a QWP film may be included on the display 102 side of composite lens system 1100 to convert light 101 to circularly polarized light 101 for use by first HWP SW 104.

As shown in FIG. 11, first PB-phase lens film 106 provides a focal length of +F1 or −F1, and second PB-phase lens film 106 provides a focal length of −F2 or +F2, depending on the input polarization state of the light they receive. Similarly, PB-phase lens SW 206 provides a focal length of +F3, 0, or −F3, depending on the state of its control signal and the input polarization state of the light it receives.

In this configuration, first HWP SW 104 selects the circular polarization state for the light incident on first PB-phase lens film 106, which in turn determines the sign of the focal length (+F1 or −F1) that first PB-phase lens film 106 imposes on that light. Similarly, second HWP SW 104 selects the circular polarization state for the light incident on second PB-phase lens film 106, which in turn determines the sign of the focal length (+F2 or −F2) that second PB-phase lens film 106 imposes on the light it receives. Finally, third HWP SW 104 selects the circular polarization state for the light incident on PB-phase lens film 106, which in turn determines the sign of the focal length (+F3 or −F3) that PB-phase lens SW 206 imposes on the light it receives when PB-phase lens SW 206 is set to a focusing state.

Consequently, composite lens system 1100 may provide up to twelve discrete focal states (e.g., −F1−F2−F3, −F1−F2, −F1−F2+F3, −F1+F2−F3, −F1+F2, −F1+F3+F3, F1−F2−F3, F1−F2, F1−F2+F3, F1+F2−F3, F1+F2, and F1+F2+F3). Further, as shown in previous embodiments, one or more different ratios of F1, F2, and F3 may result in the focal lengths of the twelve discrete focal length states to be equally spaced in lens power or focal length.

Some or all of the optical components of composite lens system 1100 may be separated by an air gap or may be bonded with an optical adhesive. Further, the placement of first and second PB-phase lens films 106, as well as PB-phase lens SW 206, within composite lens system 1100 may be swapped in other examples while providing the same functionality.

FIG. 12 is a side view of a composite lens system 1200 that includes, in an order encountered by light 101, a first HWP SW 104, a first PB-phase lens SW 206, a second HWP SW 104, and a second PB-phase lens SW 206 (e.g., as shown in FIG. 2), along with a third HWP SW 104 and a third PB-phase lens SW 206. In some embodiments, composite lens system 1200 presumes light 101 is circularly polarized. In other examples in which light 101 is linearly polarized, a QWP film may be included on the display 102 side of composite lens system 1200 to convert light 101 to circularly polarized light 101 for use by first HWP SW 104.

First PB-phase lens SW 206 provides a focal length of +F1, 0, or −F1, depending on the state of its control signal (e.g., whether first PB-phase lens SW 206 is set to a focusing state) and the input polarization state of the light it receives, as described above. Similarly, second PB-phase lens SW 206 provides a focal length of −F2, 0, or +F2, depending on the state of its control signal and the input polarization state of the light it receives. Finally, third PB-phase lens SW 206 provides a focal length of +F3, 0, or −F3, depending on the state of its control signal and the input polarization state of the light it receives.

In this configuration, first HWP SW 104 selects the circular polarization state for the light incident on first PB-phase lens SW 206, which in turn determines the sign of the focal length (+F1 or −F1) that first PB-phase lens SW 206 imposes on that light when first PB-phase lens SW 206 is set to a focusing state. Similarly, second HWP SW 104 selects the circular polarization state for the light incident on second PB-phase lens SW 206, which in turn determines the sign of the focal length (+F2 or −F2) that second PB-phase lens SW 206 imposes on the light it receives when second PB-phase lens SW 206 is set to a focusing state. Finally, third HWP SW 104 selects the circular polarization state for the light incident on third PB-phase lens film 206, which in turn determines the sign of the focal length (+F3 or −F3) that third PB-phase lens film 106 imposes on the light it receives when third PB-phase lens SW 206 is set to a focusing state.

Consequently, composite lens system 1200 may provide up to 27 discrete focal states (e.g., −F1−F2−F3, −F1−F2, −F1−F2+F3, −F1−F3, −F1, −F1+F3, −F1+F2−F3, −F1+F2, −F1+F2+F3, −F2−F3, −F2, −F2+F3, −F3, 0, +F3, +F2−F3, +F2, +F2+F3, +F1−F2−F3, +F1−F2, +F1−F2+F3, +F1−F3, +F1, +F1+F3, +F1+F2−F3, +F1+F2, and +F1+F2+F3). Further, as shown in previous embodiments, one or more different ratios of F1, F2, and F3 may result in the focal lengths of the 27 discrete focal length states to be equally spaced in lens power or focal length.

Some or all of the optical components of composite lens system 1200 may be separated by an air gap or may be bonded with an optical adhesive. Further, the placement of first, second, and third PB-phase lens SW 206 within composite lens system 1200 may be swapped in other examples while providing the same functionality.

FIG. 13 is a side view of a composite lens system 1300 that includes, in an order encountered by light 101, a first PB-phase lens SW 206, a first HWP SW 104, and a second PB-phase lens SW 206 (e.g., as shown in FIG. 4), along with a second HWP SW 104 and a third PB-phase lens SW 206. In some embodiments, composite lens system 1300 presumes light 101 is circularly polarized. In other examples in which light 101 is linearly polarized, a QWP film may be included on the display 102 side of composite lens system 1300 to convert light 101 to circularly polarized light 101 for use by first PB-phase lens SW 206.

First PB-phase lens SW 206 provides a focal length of +F1, 0, or −F1, depending on the state of its control signal (e.g., whether first PB-phase lens SW 206 is set to a focusing state) and the input polarization state of the light it receives, as described above. Second PB-phase lens SW 206 provides a focal length of −F2, 0, or +F2, depending on the state of its control signal and the input polarization state of the light it receives. Also, third PB-phase lens SW 206 provides a focal length of +F3, 0, or −F3, depending on the state of its control signal and the input polarization state of the light it receives.

In this configuration, since first PB-phase lens SW 206 is not preceded by an HWP SW 104, first PB-phase lens SW 206, when set to a focusing state, provides a focal length of either +F1 or −F1, but not both, as the circular polarization of light 101 received from display 102 is presumably unchangeable. First HWP SW 104 selects the circular polarization state for the light incident on second PB-phase lens SW 206, which in turn determines the sign of the focal length (+F2 or −F2) that second PB-phase lens SW 206 imposes on the light it receives when PB-phase lens SW 206 is set to a focusing state. Finally, second HWP SW 104 selects the circular polarization state for the light incident on third PB-phase lens film 106, which in turn determines the sign of the focal length (+F3 or −F3) that third PB-phase lens SW 206 imposes on the light it receives when third PB-phase lens SW 206 is set to a focusing state.

Consequently, composite lens system 1300 may provide up to eighteen discrete focal states (e.g., −F1−F2−F3, −F1−F3, −F1+F2−F3, −F2−F3, −F3, F2−F3, −F1−F2, −F1, −F1+F2, −F2, 0, F2, −F1−F2+F3, −F1+F3, −F1+F2+F3, −F2+F3, +F3, and F2+F3 for a first polarization state of light 101, or F1−F2−F3, F1−F3, F1+F2−F3, −F2−F3, −F3, F2−F3, F1−F2, F1, F1+F2, −F2, 0, F2, F1−F2+F3, F1+F3, F1+F2+F3, −F2+F3, +F3, and F2+F3 for a second polarization state of light 101). Further, as shown in previous embodiments, one or more different ratios of F1, F2, and F3 may result in the focal lengths of the eighteen discrete focal length states to be equally spaced in lens power or focal length. In these particular embodiments, the set of possible discrete focal lengths is not balanced about the focal length of 0, which may be beneficial in some applications.

Some or all of the optical components of composite lens system 1300 may be separated by an air gap or may be bonded with an optical adhesive. Further, the placement of first, second, and third PB-phase lens SW 206 within composite lens system 1300 may be swapped in other examples while providing the same functionality.

Figure 14:
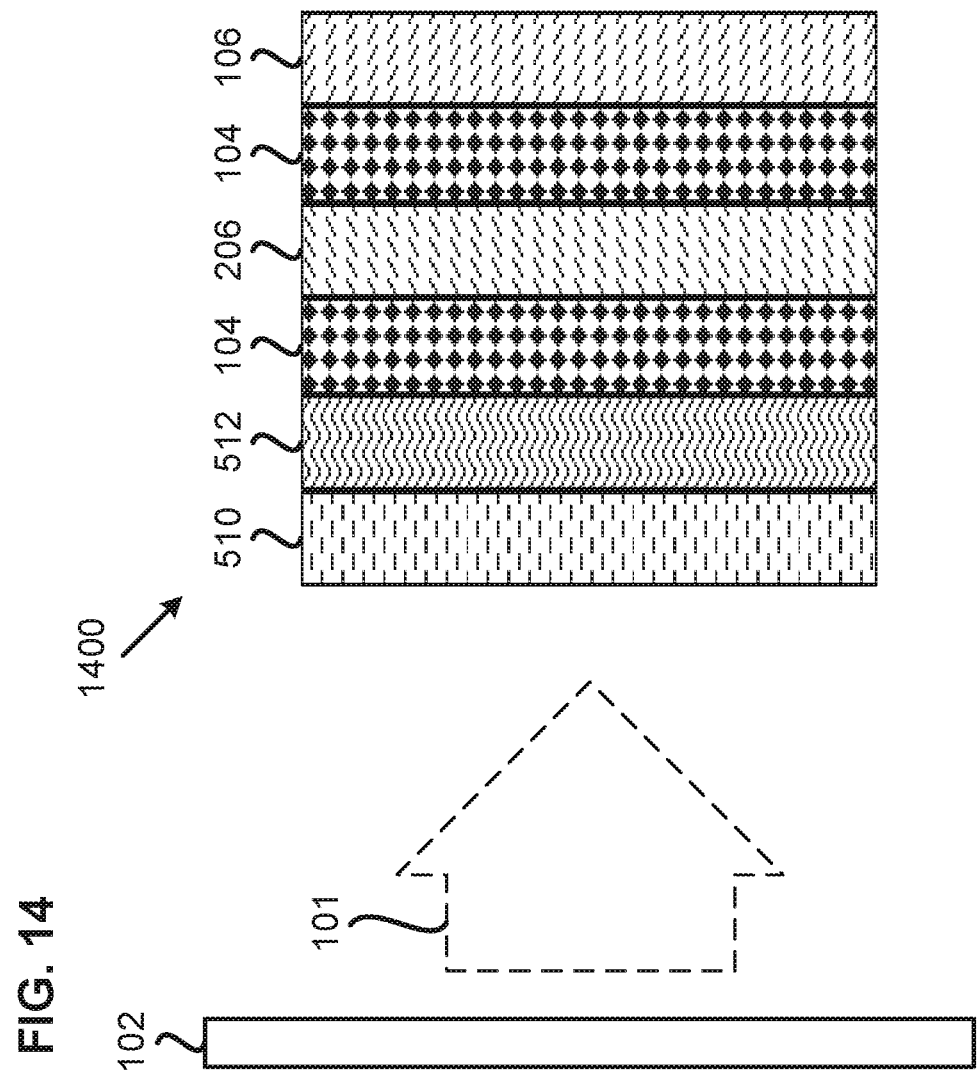
FIGS. 14-19 are side views of various composite lens systems including two PB-phase lenses and one LC GRIN lens, in accordance with example implementations of the present disclosure.
Figure 15:
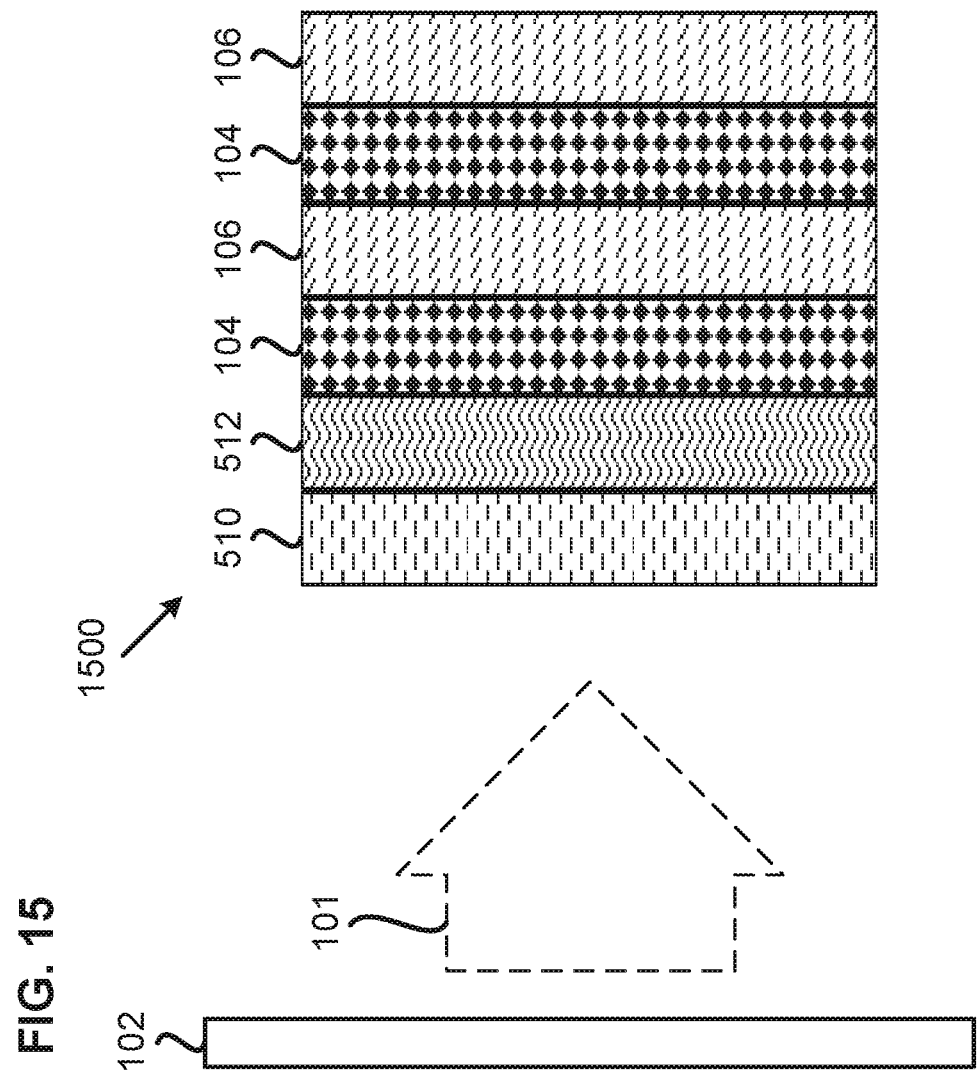
Figure 16:
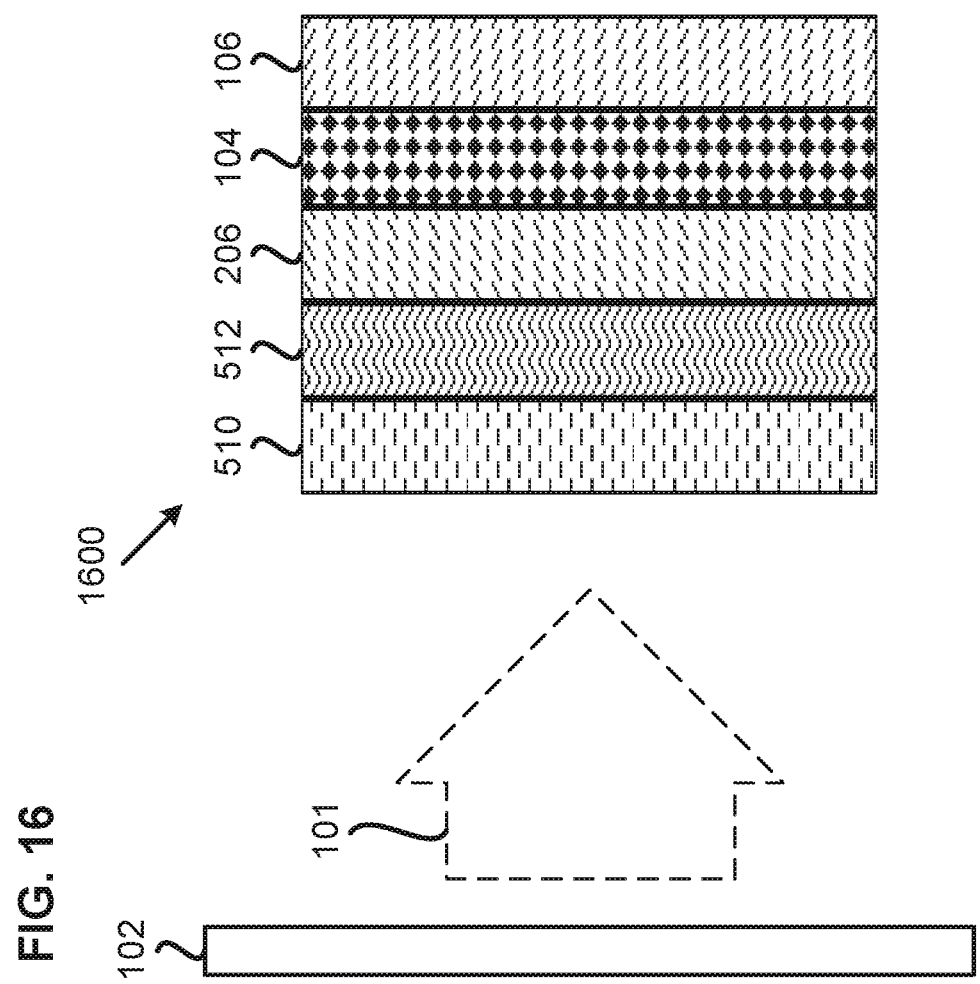
Figure 17:
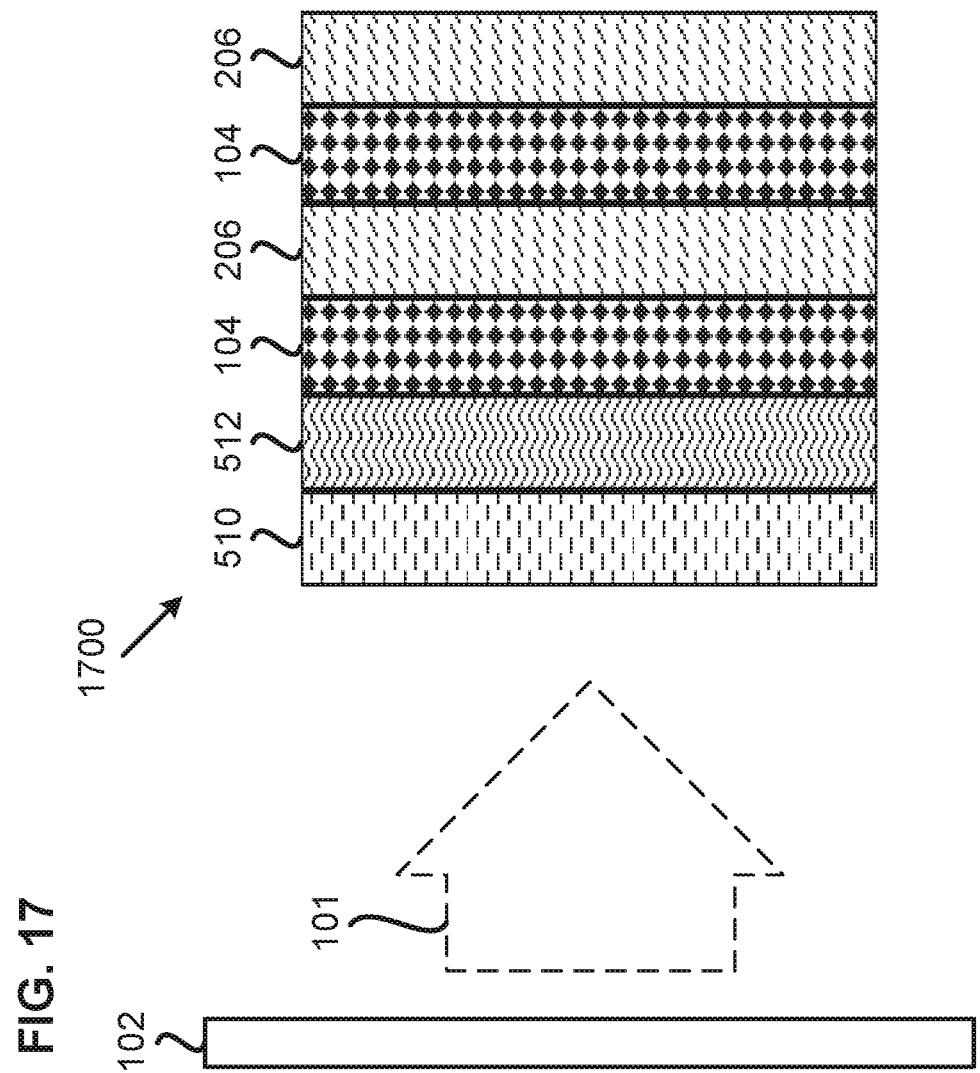
Figure 18:
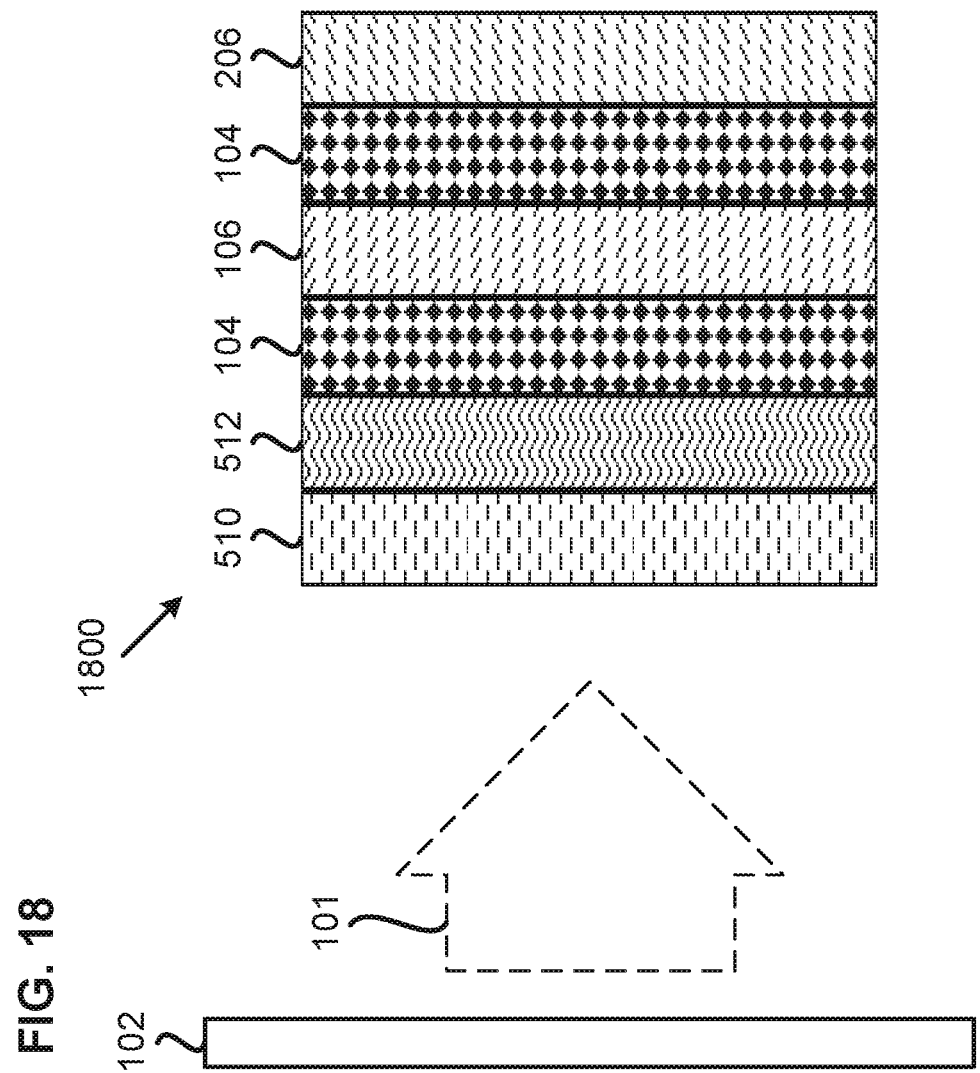
Figure 19:
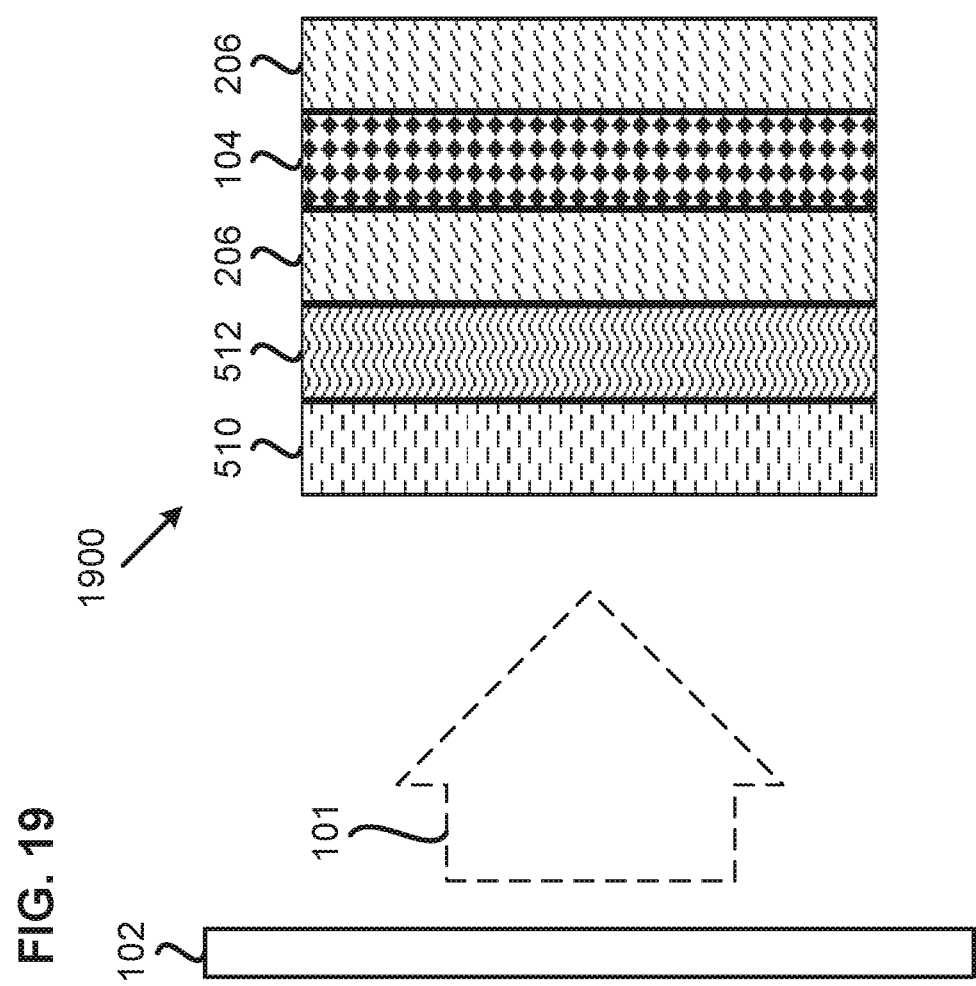

FIGS. 14-19 are side views of various composite lens systems including two PB-phase lenses and one LC GRIN lens, in accordance with example implementations of the present disclosure. More specifically, FIGS. 14, 15, and 16 are based on the systems of FIGS. 5, 6, and 7, respectively, with an additional HWP SW 104 and PB-phase lens film 106, while FIGS. 17, 18, and 19 are based on the systems of FIGS. 5, 6, and 7, respectively, with an additional HWP SW 104 and PB-phase lens SW 206.

For example, FIG. 14 is a side view of a composite lens system 1400 that includes, in an order encountered by light 101, an LC GRIN lens 510, a QWP film 512, an HWP SW 104, and a PB-phase lens SW 206 (e.g., as depicted in FIG. 5 for composite lens system 500), along with a second HWP SW 104 and a PB-phase lens film 106. As shown, composite lens system 1400 presumes light 101 is linearly polarized in a particular direction compatible with LC GRIN lens 510. In other examples in which light 101 is circularly polarized, an additional QWP film may be included on the display 102 side of composite lens system 1400 to convert light 101 to linearly polarized light 101 for use by LC GRIN lens 510.

LC GRIN lens 510, based on one or more control signals provided thereto, may provide a focal length within a continuous or near-continuous range of −F1 to +F1, as discussed earlier, to light 101 received from display 102. PB-phase lens SW 206 provides a focal length of +F2, 0, or −F2, depending on the state of its control signal (e.g., whether PB-phase lens SW 206 is set to a focusing state) and the input polarization state of the light it receives, as described above. Additionally, PB-phase lens film 106 provides a focal length of +F3 or −F3, depending on the input polarization state of the light it receives.

In this configuration, QWP film 512 converts linearly polarized light received from LC GRIN lens 510 to circularly polarized light for use by PB-phase lens SW 206. Further, first HWP SW 104 selects the circular polarization state for the light incident on PB-phase lens SW 206, which in turn determines the sign of the focal length (+F2 or −F2) that second PB-phase lens film 106 imposes on the light it receives when PB-phase lens SW 206 is set to a focusing state. Finally, second HWP SW 104 selects the circular polarization state for the light incident on PB-phase lens film 106, which in turn determines the sign of the focal length (+F3 or −F3) that PB-phase lens film 106 imposes on the light it receives.

Consequently, composite lens system 1400 may provide up to six focal length ranges. Further, in circumstances in which F1, F2, and F3 are appropriately selected, the resulting focal length ranges may form a single continuous or near-continuous focal length range of −F1−F2−F3 to +F1+F2+F3.

Some or all of the optical components of composite lens system 1400 may be separated by an air gap or may be bonded with an optical adhesive. Further, in other embodiments, LC GRIN lens 510 may be placed on the non-display 102 side of either PB-phase lens SW 206 or PB-phase lens film 106 to provide the same functionality. In such embodiments, an additional HWP SW 104 and at least one additional QWP film 512 may be placed between PB-phase lens SW 206 or PB-phase lens film 106 and LC GRIN lens 510 to convert the circular polarization of light from PB-phase lens SW 206 or PB-phase lens film 106 to linear polarization for LC GRIN lens 510.

FIG. 15 is a side view of a composite lens system 1500 that includes, in an order encountered by light 101, an LC GRIN lens 510, a QWP film 512, a first HWP SW 104, and a first PB-phase lens film 106 (e.g., as depicted in FIG. 6 for composite lens system 600), along with a second HWP SW 104 and a second PB-phase lens film 106. As shown, composite lens system 1500 presumes light 101 is linearly polarized in a particular direction compatible with LC GRIN lens 510. In other examples in which light 101 is circularly polarized, an additional QWP film may be included on the display 102 side of composite lens system 1500 to convert light 101 to linearly polarized light 101 for use by LC GRIN lens 510.

LC GRIN lens 510, based on one or more control signals provided thereto, may provide a focal length within a continuous or near-continuous range of −F1 to +F1 to light 101 received from display 102. First PB-phase lens film 106 provides a focal length of +F2 or −F2, depending on the input polarization state of the light it receives, as described above. Additionally, second PB-phase lens film 106 provides a focal length of +F3 or −F3, depending on the input polarization state of the light it receives.

In this configuration, QWP film 512 converts linearly polarized light received from LC GRIN lens 510 to circularly polarized light for use by PB-phase lens film 106. Further, first HWP SW 104 selects the circular polarization state for the light incident on first PB-phase lens film 106, which in turn determines the sign of the focal length (+F2 or −F2) that first PB-phase lens film 106 imposes on the light it receives. Finally, second HWP SW 104 selects the circular polarization state for the light incident on second PB-phase lens film 106, which in turn determines the sign of the focal length (+F3 or −F3) that second PB-phase lens film 106 imposes on the light it receives.

Consequently, composite lens system 1500 may provide up to four focal length ranges. Further, in circumstances in which F1, F2, and F3 are appropriately selected, the resulting focal length ranges may form a single continuous or near-continuous focal length range of −F1−F2−F3 to +F1+F2+F3.

Some or all of the optical components of composite lens system 1500 may be separated by an air gap or may be bonded with an optical adhesive. Further, in other embodiments, LC GRIN lens 510 may be placed on the non-display 102 side of either first or second PB-phase lens film 106 to provide the same functionality. In such embodiments, an additional HWP SW 104 and at least one additional QWP film 512 may be placed between first or second PB-phase lens film 106 and LC GRIN lens 510 to convert the circular polarization of light from first or second PB-phase lens film 106 to linear polarization for LC GRIN lens 510.

FIG. 16 is a side view of a composite lens system 1600 that includes, in an order encountered by light 101, an LC GRIN lens 510, a QWP film 512, and a PB-phase lens SW 206 (e.g., as depicted in FIG. 7 for composite lens system 700), along with an HWP SW 104 and a PB-phase lens film 106. As shown, composite lens system 1600 presumes light 101 is linearly polarized in a particular direction compatible with LC GRIN lens 510. In other examples in which light 101 is circularly polarized, an additional QWP film may be included on the display 102 side of composite lens system 1600 to convert light 101 to linearly polarized light 101 for use by LC GRIN lens 510.

LC GRIN lens 510, based on one or more control signals provided thereto, may provide a focal length within a continuous or near-continuous range of −F1 to +F1 to light 101 received from display 102. PB-phase lens SW 206 provides a focal length of +F2, 0, or −F2, depending on the state of its control signal (e.g., whether PB-phase lens SW 206 is set to a focusing state) and the input polarization state of the light it receives. Additionally, PB-phase lens film 106 provides a focal length of +F3 or −F3, depending on the input polarization state of the light it receives.

In this configuration, QWP film 512 converts linearly polarized light received from LC GRIN lens 510 to circularly polarized light for use by PB-phase lens SW 106. Since PB-phase lens SW 206 is not preceded by an HWP SW 104, PB-phase lens SW 206, when set to a focusing state, provides a focal length of either +F2 or −F2, but not both, as the circular polarization of light 101 received from QWP film 512, as originated by panel 102, is unchangeable. Finally, HWP SW 104 selects the circular polarization state for the light incident on PB-phase lens film 106, which in turn determines the sign of the focal length (+F3 or −F3) that PB-phase lens film 106 imposes on the light it receives.

Consequently, composite lens system 1600 may provide up to four focal ranges for each polarization state of light 101. Further, in circumstances in which F1, F2, and F3 are appropriately selected, the resulting focal length ranges may form a single continuous or near-continuous focal length range of −F1−F2−F3 to +F1+F3 or −F1−F3 to +F1+F2+F3, depending on the rotational sense of circularly polarized light 101. In these particular embodiments, the focal length ranges are not balanced about the focal length of 0, which may be beneficial in some applications.

Some or all of the optical components of composite lens system 1600 may be separated by an air gap or may be bonded with an optical adhesive. Further, in other embodiments, LC GRIN lens 510 may be placed on the non-display 102 side of either PB-phase lens SW 206 or PB-phase lens film 106 to provide the same functionality. In such embodiments, an additional HWP SW 104 and at least one additional QWP film 512 may be placed between PB-phase lens SW 206 or PB-phase lens film 106 and LC GRIN lens 510 to convert the circular polarization of light from that PB-phase lens SW 206 or PB-phase lens film 106 to linear polarization for LC GRIN lens 510.

As mentioned above, FIGS. 17, 18, and 19 are based on the systems of FIGS. 5, 6, and 7, respectively, with an additional HWP SW 104 and PB-phase lens SW 206. For example, FIG. 17 is a side view of a composite lens system 1700 that includes, in an order encountered by light 101, an LC GRIN lens 510, a QWP film 512, a first HWP SW 104, and a first PB-phase lens SW 206 (e.g., as depicted in FIG. 5 for composite lens system 500), along with a second HWP SW 104 and a second PB-phase lens SW 206. As shown, composite lens system 1700 presumes light 101 is linearly polarized in a particular direction compatible with LC GRIN lens 510. In other examples in which light 101 is circularly polarized, an additional QWP film may be included on the display 102 side of composite lens system 1700 to convert light 101 to linearly polarized light 101 for use by LC GRIN lens 510.

LC GRIN lens 510, based on one or more control signals provided thereto, may provide a focal length within a continuous or near-continuous range of −F1 to +F1, as discussed earlier, to light 101 received from display 102. First PB-phase lens SW 206 provides a focal length of +F2, 0, or −F2, depending on the state of its control signal (e.g., whether first PB-phase lens SW 206 is set to a focusing state) and the input polarization state of the light it receives, as described above. Additionally, second PB-phase lens SW 206 provides a focal length of +F3, 0, or −F3, depending on the state of its control signal and the input polarization state of the light it receives.

In this configuration, QWP film 512 converts linearly polarized light received from LC GRIN lens 510 to circularly polarized light for use by first PB-phase lens SW 206. Further, first HWP SW 104 selects the circular polarization state for the light incident on first PB-phase lens SW 206, which in turn determines the sign of the focal length (+F2 or −F2) that first PB-phase lens SW 206 imposes on the light it receives when first PB-phase lens SW 206 is set to a focusing state. Finally, second HWP SW 104 selects the circular polarization state for the light incident on second PB-phase lens SW 206, which in turn determines the sign of the focal length (+F3 or −F3) that second PB-phase lens film 106 imposes on the light it receives when second PB-phase lens SW 206 is set to a focusing state.

Consequently, composite lens system 1700 may provide up to nine focal length ranges. Further, in circumstances in which F1, F2, and F3 are appropriately selected, the resulting focal length ranges may form a single continuous or near-continuous focal length range of −F1−F2−F3 to +F1+F2+F3.

Some or all of the optical components of composite lens system 1700 may be separated by an air gap or may be bonded with an optical adhesive. Further, in other embodiments, LC GRIN lens 510 may be placed on the non-display 102 side of either first or second PB-phase lens SW 206 to provide the same functionality. In such embodiments, an additional HWP SW 104 and at least one additional QWP film 512 may be placed between first or second PB-phase lens SW 206 and LC GRIN lens 510 to convert the circular polarization of light from first or second PB-phase lens SW 206 to linear polarization for LC GRIN lens 510.

FIG. 18 is a side view of a composite lens system 1800 that includes, in an order encountered by light 101, an LC GRIN lens 510, a QWP film 512, a first HWP SW 104, and a PB-phase lens film 106 (e.g., as depicted in FIG. 6 for composite lens system 600), along with a second HWP SW 104 and a PB-phase lens SW 206. As shown, composite lens system 1800 presumes light 101 is linearly polarized in a particular direction compatible with LC GRIN lens 510. In other examples in which light 101 is circularly polarized, an additional QWP film may be included on the display 102 side of composite lens system 1800 to convert light 101 to linearly polarized light 101 for use by LC GRIN lens 510.

LC GRIN lens 510, based on one or more control signals provided thereto, may provide a focal length within a continuous or near-continuous range of −F1 to +F1 to light 101 received from display 102. PB-phase lens film 106 provides a focal length of +F2 or −F2, depending on the input polarization state of the light it receives, as described above. Additionally, PB-phase lens SW 206 provides a focal length of +F3, 0, or −F3, depending on the state of its control signal and the input polarization state of the light it receives.

In this configuration, QWP film 512 converts linearly polarized light received from LC GRIN lens 510 to circularly polarized light for use by PB-phase lens film 106. Further, HWP SW 104 selects the circular polarization state for the light incident on PB-phase lens film 106, which in turn determines the sign of the focal length (+F2 or −F2) that second PB-phase lens film 106 imposes on the light it receives. Finally, second HWP SW 104 selects the circular polarization state for the light incident on PB-phase lens SW 206, which in turn determines the sign of the focal length (+F3 or −F3) that PB-phase lens SW 206 imposes on the light it receives when PB-phase lens SW 206 is set by control signal to a focusing state.

Consequently, composite lens system 1800 may provide up to six focal length ranges. Further, in circumstances in which F1, F2, and F3 are appropriately selected, the resulting focal length ranges may form a single continuous or near-continuous focal length range of −F1−F2−F3 to +F1+F2+F3.

Some or all of the optical components of composite lens system 1800 may be separated by an air gap or may be bonded with an optical adhesive. Further, in other embodiments, LC GRIN lens 510 may be placed on the non-display 102 side of either PB-phase lens film 106 or PB-phase lens SW 206 to provide the same functionality. In such embodiments, an additional HWP SW 104 and at least one additional QWP film 512 may be placed between PB-phase lens film 106 or PB-phase lens SW 206 and LC GRIN lens 510 to convert the circular polarization of light from PB-phase lens film 106 or PB-phase lens SW 206 to linear polarization for LC GRIN lens 510.

FIG. 19 is a side view of a composite lens system 1900 that includes, in an order encountered by light 101, an LC GRIN lens 510, a QWP film 512, and a first PB-phase lens SW 206 (e.g., as depicted in FIG. 7 for composite lens system 700), along with an HWP SW 104 and a second PB-phase lens SW 206. As shown, composite lens system 1900 presumes light 101 is linearly polarized in a particular direction compatible with LC GRIN lens 510. In other examples in which light 101 is circularly polarized, an additional QWP film may be included on the display 102 side of composite lens system 1900 to convert light 101 to linearly polarized light 101 for use by LC GRIN lens 510.

LC GRIN lens 510, based on one or more control signals provided thereto, may provide a focal length within a continuous or near-continuous range of −F1 to +F1 to light 101 received from display 102. First PB-phase lens SW 206 provides a focal length of +F2, 0, or −F2, depending on the state of its control signal and the input polarization state of the light it receives. Additionally, second PB-phase lens SW 206 provides a focal length of +F3, 0, or −F3, depending on the state of its control signal and the input polarization state of the light it receives.

In this configuration, QWP film 512 converts linearly polarized light received from LC GRIN lens 510 to circularly polarized light for use by first PB-phase lens SW 206. Since PB-phase lens SW 206 is not preceded by an HWP SW 104, PB-phase lens SW 206, when set to a focusing state, provides a focal length of either +F2 or −F2, but not both, as the circular polarization of light 101 received from QWP film 512, as originated by panel 102, is unchangeable. Finally, HWP SW 104 selects the circular polarization state for the light incident on second PB-phase lens SW 206, which in turn determines the sign of the focal length (+F3 or −F3) that second PB-phase lens film 106 imposes on the light it receives when second PB-phase lens SW 206 is set by control signal to a focusing state.

Consequently, composite lens system 1900 may provide up to six focal ranges for each polarization state of light 101. Further, in circumstances in which F1, F2, and F3 are appropriately selected, the resulting focal length ranges may form a single continuous or near-continuous focal length range of −F1−F2−F3 to +F1+F3 or −F1−F3 to +F1+F2+F3, depending on the rotational sense of circularly polarized light received from QWP film 512. In these particular embodiments, the focal length ranges are not balanced about the focal length of 0, which may be beneficial in some applications.

Some or all of the optical components of composite lens system 1900 may be separated by an air gap or may be bonded with an optical adhesive. Further, in other embodiments, LC GRIN lens 510 may be placed on the non-display 102 side of first or second PB-phase lens SW 206 to provide the same functionality. In such embodiments, an additional HWP SW 104 and at least one additional QWP film 512 may be placed between first or second PB-phase lens SW 206 and LC GRIN lens 510 to convert the circular polarization of light from that PB-phase lens film 106 to linear polarization for LC GRIN lens 510.

Figure 20:
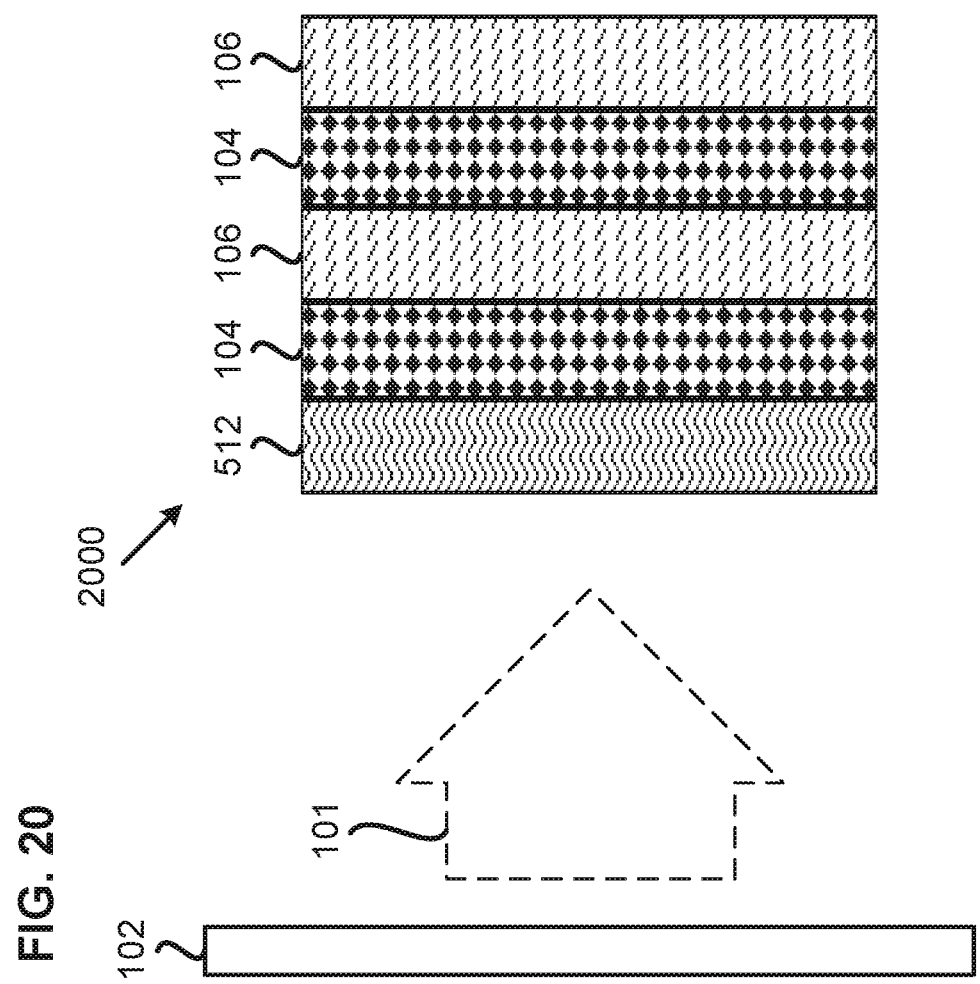
FIG. 20 is a side view of a composite lens system including a display-side QWP film, in accordance with an example implementation of the present disclosure.

FIG. 20 is a side view of a composite lens system 2000 including a display-side QWP film 512, in accordance with an example implementation of the present disclosure. Composite lens system 2000 includes, in an order encountered by light 101, an initial QWP film 512, followed by a first HWP SW 104, a first PB-phase lens film 106, a second HWP SW 104, and a second PB-phase lens film 106 (e.g., as depicted in FIG. 1 for composite lens system 100). In this configuration, QWP plate 512 is employed on the display 102 side of composite lens system 2000 to convert linearly polarized light 101 to circularly polarized light for use by the next component (e.g., first HWP SW 104) of composite lens system 2000. While the addition of QWP plate 512 is shown as an adaptation of composite lens system 100 of FIG. 1, an additional QWP plate 512 may also be placed to receive linearly polarized light 101 directly from display 102 and convert that light to circularly polarized light in the examples of FIGS. 2-4 and 8-13. Further, in additional embodiments based on FIGS. 2-4 and 8-13, the initial QWP film 512 and subsequent HWP SW 104 may be replaced with a IPS (in-plane switching) mode QWP TN (twisted nematic) SW LCD (liquid crystal display). In such examples, linearly polarized light 101 is converted to circularly polarized light. Further, where the twist of the TN crystal can be reversed by the application of a voltage via the IPS electrodes, the rotational sense of the output circular polarization may be reversed. In other embodiments, initial QWP film 512 may be positioned to receive circularly polarized light 101 directly from display 102 and convert that light to linearly polarized light in the examples of FIGS. 5-7 and 14-19 (e.g., for use by LC GRIN lens 510). Other examples of composite lens systems described below may also benefit from use of an initial QWP film 512. In yet other embodiments, initial QWP film 512 may be replaced with HWP SW 206 to convert circularly polarized light 101 from one rotational sense to another, if desired.

Figure 21:
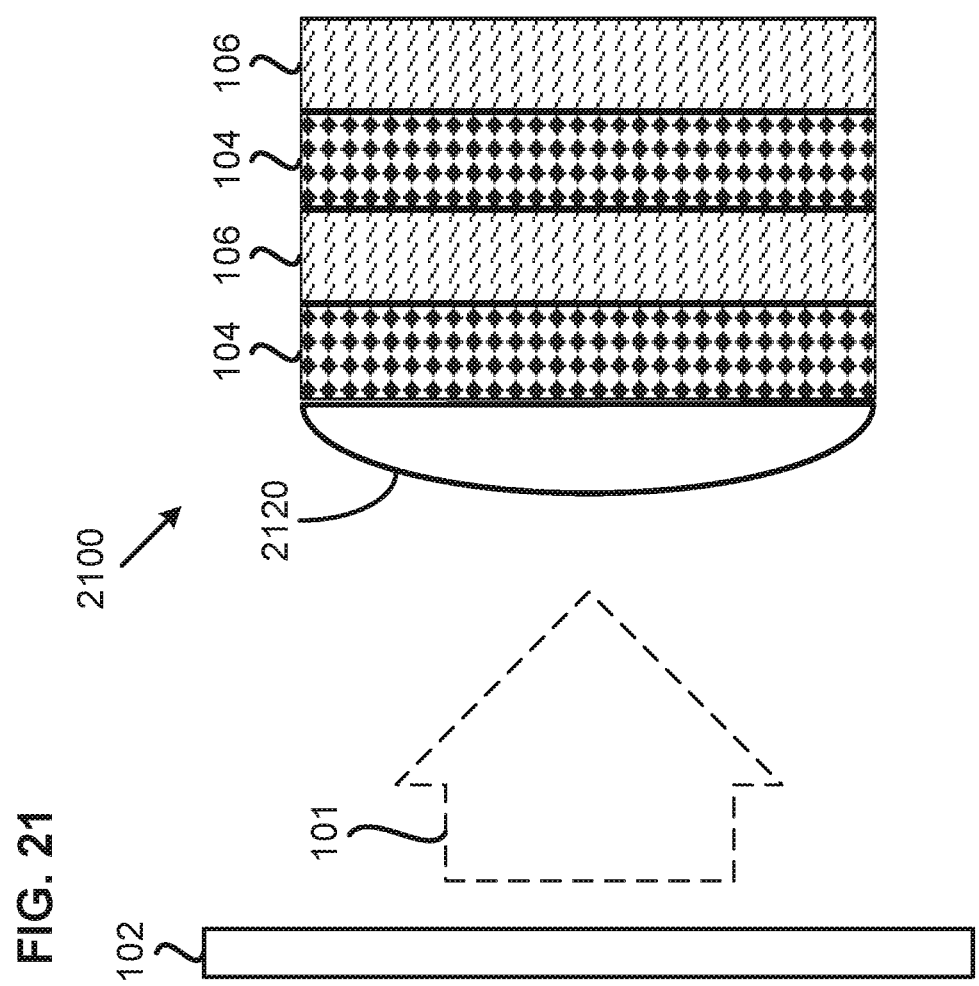
FIGS. 21 and 22 are side views of composite lens systems including a geometric lens, in accordance with example implementations of the present disclosure.
Figure 22:
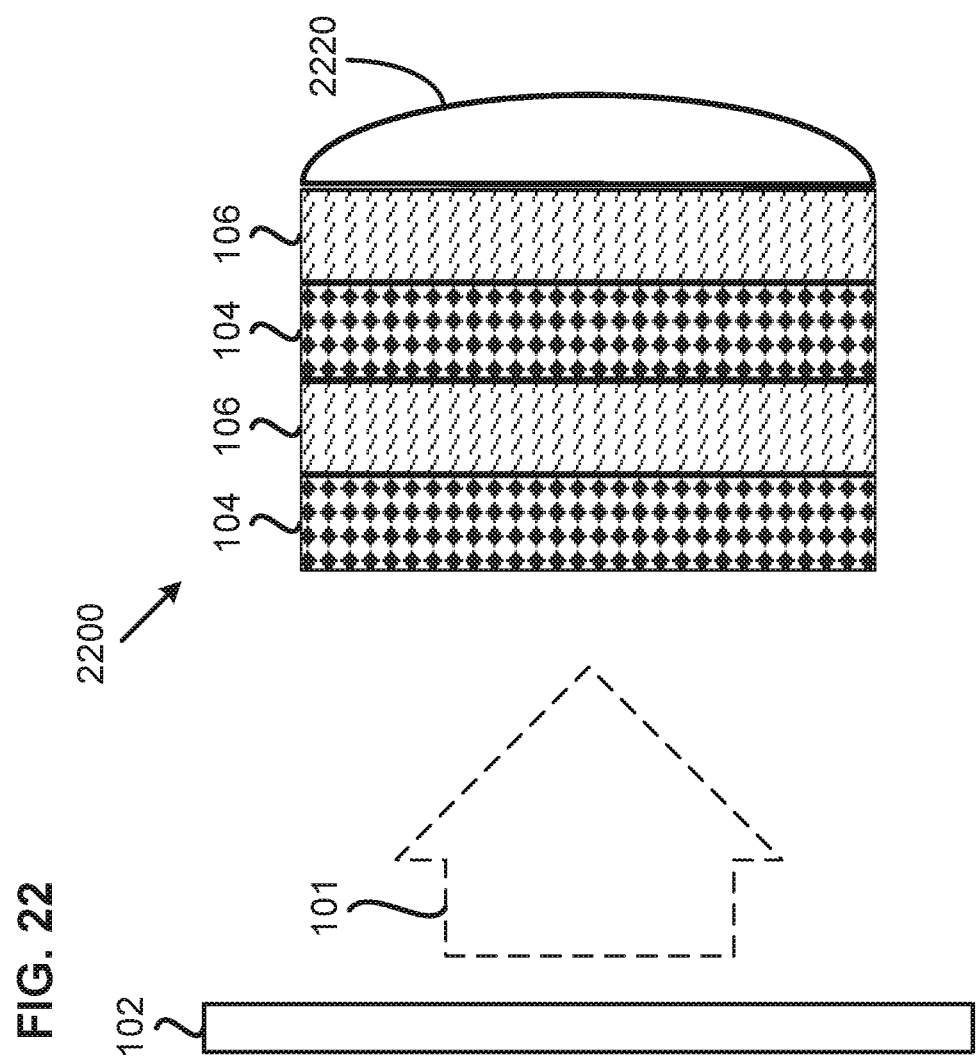

FIGS. 21 and 22 are side views of composite lens systems that include a geometric lens (e.g., a fixed lens), in accordance with example implementations of the present disclosure. More specifically, FIG. 21 is a side view of a composite lens system 2100 including an initial geometric lens 2120, while FIG. 22 is a side view of a composite lens system 2200 including a final geometric lens 2220. Both composite lens systems 2100 and 2200 also include a first HWP SW 104, a first PB-phase lens film 106, a second HWP SW 104, and a second PB-phase lens film 106, as employed in composite lens system 100 of FIG. 1. In both embodiments, geometric lenses 2120 and 2220 shift the focal length of the remaining components by a fixed amount F0, which may have a positive or negative value. More specifically, while HWP SW 104, first PB-phase lens film 106, second HWP SW 104, and second PB-phase lens film 106 provide up to four discrete focal lengths (e.g., −F1−F2, −F1+F2, +F1−F2, and +F1+F2), as discussed above with respect to FIG. 1, the use of geometric lens 2120 or 2220 shifts those focal lengths by F0 (e.g., F0−F1−F2, F0−F1+F2, F0+F1−F2, and F0+F1+F2).

In yet other examples, both of the initial geometric lens 2120 and final geometric lens 2220 may be employed together (not shown in the figures) to shift the discrete focal lengths provided by composite lens system 100 of FIG. 1. Additionally, other composite lens systems described above with reference to FIGS. 2-20, as well as other lenses disclosed herein, may also be adapted to employ either or both initial geometric lens 2120 and final geometric lens 2220 to shift the focal lengths provided by corresponding composite lens systems 200-2000.

Figure 23:
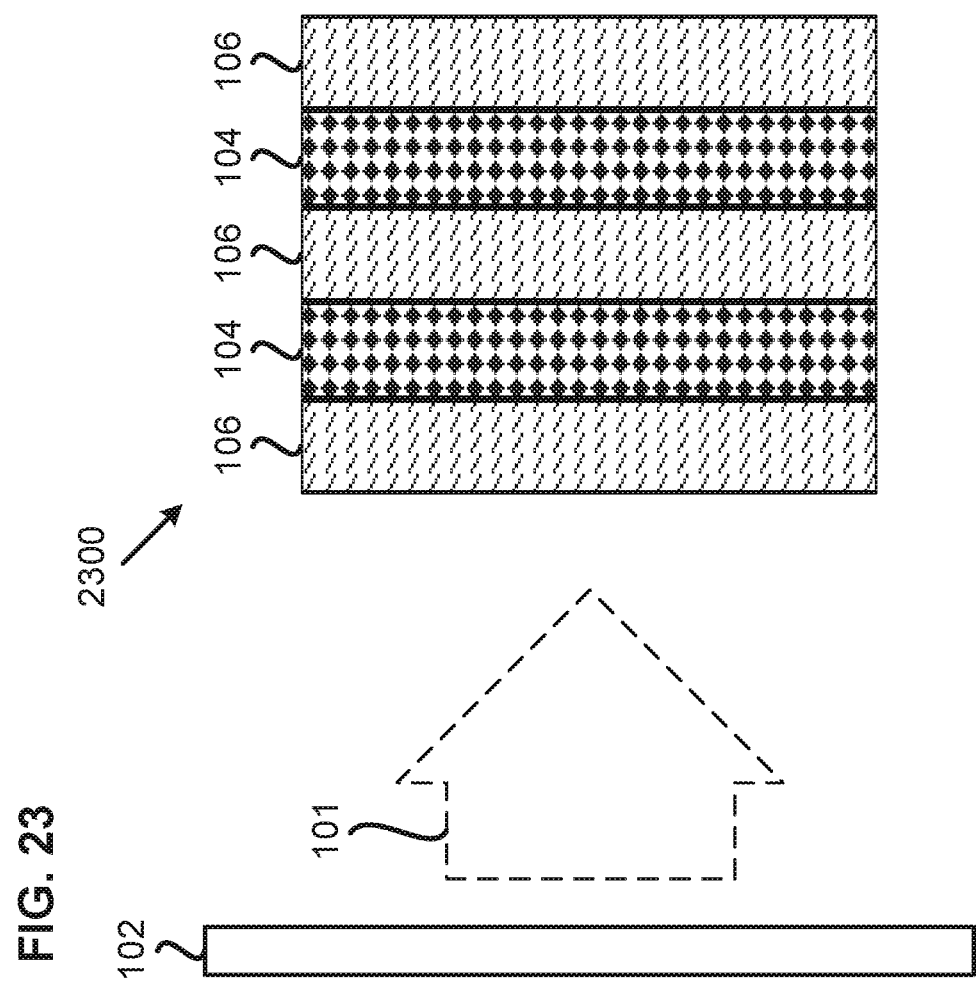
FIG. 23 is a side view of another composite lens system, in accordance with an example implementation of the present disclosure.

FIG. 23 is a side view of another composite lens system 2300, in accordance with an example implementation of the present disclosure. Composite lens system 2300 represents an adaptation of composite lens system 100 of FIG. 1, which includes a first HWP SW 104, a first PB-phase lens film 106, a second HWP SW 104, and a second PB-phase lens film 106. Composite lens system 2300, however, also provides an initial PB-phase lens film 106 on display 102 side of composite lens system 2300 (e.g., employed in lieu of initial geometric lens 2120 of composite lens system 2100 of FIG. 21) to shift the discrete focal lengths by a fixed amount F0, presuming light 101 is circularly polarized. More specifically, while HWP SW 104, first PB-phase lens film 106, second HWP SW 104, and second PB-phase lens film 106 provide up to four discrete focal lengths (e.g., −F1−F2, −F1+F2, +F1−F2, and +F1+F2), the addition of initial PB-phase lens film 106 shifts those focal lengths by F0 (e.g., F0−F1−F2, F0−F1+F2, F0+F1−F2, and F0+F1+F2).

While composite lens system 2300 represents an adaptation of composite lens system 100 of FIG. 1, composite lens systems 200-2000 of FIGS. 2-20, as well as other lenses disclosed herein, may also be adapted to employ initial PB-phase lens film 106 to shift the focal lengths of those systems. More specifically, in cases in which the composite lens system being adapted contains LC GRIN lens 510 (e.g., composite lens systems 500, 600, 700, 1400, 1500, 1600, 1700, 1800, and 1900 of FIGS. 5-7 and 15-19), initial PB-phase lens film 106 may be included after LC GRIN lens 510 and subsequent QWP film 512. Alternatively, if initial PB-phase lens film 106 is positioned before LC GRIN lens 510, initial PB-phase lens film 106 may be followed by an additional QWP film 512 prior to LC GRIN lens 510.

In some implementations of the present disclosure, a composite lens system may selectably apply multiple discrete focal lengths (e.g., to light 101 received from a display 102) by way of a series of PB-phase lenses, HWPs, and other components. In some examples, these discrete focal lengths may be equally spaced apart. In some additional implementations, an LC GRIN lens may be added to provide multiple continuous or near-continuous focal length ranges. Further, these multiple focal length ranges may be positioned to provide one larger continuous or near continuous focal length range that would otherwise be difficult to provide. In addition, each of these implementations may be provided without physical movement of one or more optical components, thus eliminating the use of actuators or other physical mechanisms often associated with multifocal lens systems.

From the above discussion, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A composite lens system comprising: one or more first optical elements configured to provide a first focal length selected from a first continuous range of focal lengths; and one or more second optical elements configured to provide a discrete focal length selected from a plurality of discrete focal lengths, wherein the one or more first optical elements and the one or more second optical elements are configured in series such that the composite lens system provides an output focal length based on a combination of the selected first focal length and the selected discrete focal length, and the plurality of discrete focal lengths are evenly spaced apart.

2. The composite lens system of claim 1, wherein the one or more first optical elements comprise at least a liquid crystal (LC) graduated index (GRIN) lens.

3. The composite lens system of claim 1, wherein the one or more second optical elements comprise at least a first Pancharatnam-Berry (PB) phase lens element that provides:
   a first negative discrete focal length in response to receiving circularly polarized light having a first rotational sense; and
   a first positive discrete focal length in response to receiving circularly polarized light having a second rotational sense opposite the first rotational sense.

4. The composite lens system of claim 1, wherein a distance between each consecutive pair of the plurality of discrete focal lengths is less than or equal to the first continuous range of focal lengths.

5. The composite lens system of claim 1, wherein the one or more first optical elements are located between a light source that provides light to the composite lens system and the one or more second optical elements.

6. The composite lens system of claim 1, wherein the one or more second optical elements are located between a light source that provides light to the composite lens system and the one or more first optical elements.

7. The composite lens system of claim 1, further comprising an additional lens element that adds a fixed focal length to the combination of the selected first focal length and the selected discrete focal length.

8. A composite lens system comprising:
   one or more first optical elements configured to provide a first focal length selected from a first continuous range of focal lengths; and
   one or more second optical elements configured to provide a discrete focal length selected from a plurality of discrete focal lengths,
   wherein the one or more first optical elements and the one or more second optical elements are configured in series such that the composite lens system provides an output focal length based on a combination of the selected first focal length and the selected discrete focal length, and
   a distance between each consecutive pair of the plurality of discrete focal lengths is less than or equal to the first continuous range of focal lengths.

9. The composite lens system of claim 8, wherein the one or more first optical elements comprise at least a liquid crystal (LC) graduated index (GRIN) lens.

10. The composite lens system of claim 8, wherein the one or more second optical elements comprise at least a first Pancharatnam-Berry (PB) phase lens element that provides:
    a first negative discrete focal length in response to receiving circularly polarized light having a first rotational sense; and
    a first positive discrete focal length in response to receiving circularly polarized light having a second rotational sense opposite the first rotational sense.

11. The composite lens system of claim 8, wherein the one or more first optical elements are located between a light source that provides light to the composite lens system and the one or more second optical elements.

12. The composite lens system of claim 8, wherein the one or more second optical elements are located between a light source that provides light to the composite lens system and the one or more first optical elements.

13. The composite lens system of claim 8, further comprising an additional lens element that adds a fixed focal length to the combination of the selected first focal length and the selected discrete focal length.

14. A composite lens system comprising:
    one or more first optical elements configured to provide a first focal length selected from a first continuous range of focal lengths; and
    one or more second optical elements configured to provide a discrete focal length selected from a plurality of discrete focal lengths,
    wherein the one or more first optical elements and the one or more second optical elements are configured in series such that the composite lens system provides an output focal length based on a combination of the selected first focal length and the selected discrete focal length, and
    the one or more second optical elements are located between a light source that provides light to the composite lens system and the one or more first optical elements.

15. The composite lens system of claim 14, wherein the one or more first optical elements comprise at least a liquid crystal (LC) graduated index (GRIN) lens.

16. The composite lens system of claim 14, wherein the one or more second optical elements comprise at least a first Pancharatnam-Berry (PB) phase lens element that provides:
    a first negative discrete focal length in response to receiving circularly polarized light having a first rotational sense; and
    a first positive discrete focal length in response to receiving circularly polarized light having a second rotational sense opposite the first rotational sense.

17. The composite lens system of claim 14, wherein the one or more first optical elements are located between the light source that provides light to the composite lens system and the one or more second optical elements.

18. The composite lens system of claim 14, further comprising an additional lens element that adds a fixed focal length to the combination of the selected first focal length and the selected discrete focal length.

19. A composite lens system comprising:
- one or more first optical elements configured to provide a first focal length selected from a first continuous range of focal lengths; and
- one or more second optical elements configured to provide a discrete focal length selected from a plurality of discrete focal lengths,
- wherein the one or more first optical elements and the one or more second optical elements are configured in series such that the composite lens system provides an output focal length based on a combination of the selected first focal length and the selected discrete focal length, and
- the composite lens system further comprises an additional lens element that adds a fixed focal length to the combination of the selected first focal length and the selected discrete focal length.

20. The composite lens system of claim 19, wherein the one or more first optical elements comprise at least a liquid crystal (LC) graduated index (GRIN) lens.

21. The composite lens system of claim 19, wherein the one or more second optical elements comprise at least a first Pancharatnam-Berry (PB) phase lens element that provides:
- a first negative discrete focal length in response to receiving circularly polarized light having a first rotational sense; and
- a first positive discrete focal length in response to receiving circularly polarized light having a second rotational sense opposite the first rotational sense.

22. The composite lens system of claim 19, wherein the one or more first optical elements are located between a light source that provides light to the composite lens system and the one or more second optical elements.

* * * * *